United States Patent
Richter

(10) Patent No.: US 11,783,548 B2
(45) Date of Patent: Oct. 10, 2023

(54) METHOD AND DEVICE FOR PRESENTING AN AUDIO AND SYNTHESIZED REALITY EXPERIENCE

(71) Applicant: Apple Inc., Cupertino, CA (US)

(72) Inventor: Ian M. Richter, Los Angeles, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/053,676

(22) PCT Filed: May 29, 2019

(86) PCT No.: PCT/US2019/034324
§ 371 (c)(1),
(2) Date: Nov. 6, 2020

(87) PCT Pub. No.: WO2019/232005
PCT Pub. Date: Dec. 5, 2019

(65) Prior Publication Data
US 2021/0082196 A1  Mar. 18, 2021

Related U.S. Application Data

(60) Provisional application No. 62/677,904, filed on May 30, 2018.

(51) Int. Cl.
*G06T 7/60* (2017.01)
*G06T 19/00* (2011.01)
(Continued)

(52) U.S. Cl.
CPC ............ *G06T 19/006* (2013.01); *G06F 3/165* (2013.01); *G06T 7/60* (2013.01); *G06V 20/10* (2022.01); *H04N 21/43074* (2020.08)

(58) Field of Classification Search
CPC ... G06T 19/006; G06T 7/60; H04N 21/43074; G06V 20/10; G06F 3/165
(Continued)

(56) References Cited

U.S. PATENT DOCUMENTS 8,984,405 B1 * 3/2015 Geller ................. G06F 3/04817
715/753
9,143,742 B1 * 9/2015 Amira ..................... G11B 27/11
(Continued)

FOREIGN PATENT DOCUMENTS

CN 108062796 A 5/2018

OTHER PUBLICATIONS

International Search Report and Written Opinion dated Nov. 11, 2019, International Application No. PCT/US2019/034324, pp. 1-14.

*Primary Examiner* — Jin Ge
(74) *Attorney, Agent, or Firm* — Fernando & Partners, LLP

(57) ABSTRACT

In various implementations, methods of presenting an audio/SR experience are disclosed. In one embodiment, while playing an audio file in an environment, in response to determining that the respective temporal criterion and the respective environmental criterion of an SR content event is met, the SR content event is displayed in association with the environment. In one embodiment, SR content is obtained and displayed in association with an environment based on an audio file and a 3D point cloud of the environment. In one embodiment, SR content is obtained and displayed in association with an environment based on spoken words of a real sound of the environment.

22 Claims, 37 Drawing Sheets

(51) Int. Cl.
   *G06F 3/16*      (2006.01)
   *G06V 20/10*     (2022.01)
   *H04N 21/43*     (2011.01)

(58) Field of Classification Search
   USPC .......................................................... 345/633
   See application file for complete search history.

(56) References Cited

U.S. PATENT DOCUMENTS

| | | | | |
|---|---|---|---|---|
| 9,704,298 | B2* | 7/2017 | Espeset | G06T 7/30 |
| 10,284,809 | B1* | 5/2019 | Noel | H04N 5/9305 |
| 10,503,964 | B1* | 12/2019 | Valgardsson | G06T 19/006 |
| 10,555,023 | B1* | 2/2020 | McCarthy | H04N 21/8549 |
| 10,979,676 | B1* | 4/2021 | Kelly | H04N 7/183 |
| 2014/0075317 | A1* | 3/2014 | Dugan | G06F 3/04817 |
| | | | | 715/719 |
| 2014/0176604 | A1* | 6/2014 | Venkitaraman | G09G 5/377 |
| | | | | 345/633 |
| 2015/0382079 | A1* | 12/2015 | Lister | G11B 27/34 |
| | | | | 725/38 |
| 2016/0012609 | A1* | 1/2016 | Laska | G06V 40/172 |
| | | | | 382/103 |
| 2017/0078825 | A1 | 3/2017 | Mangiat et al. | |
| 2018/0035137 | A1* | 2/2018 | Chen | H04N 21/2743 |
| 2018/0046256 | A1* | 2/2018 | Holz | G06F 3/0304 |
| 2018/0082117 | A1* | 3/2018 | Sharma | G06T 19/003 |
| 2018/0089935 | A1* | 3/2018 | Froy, Jr. | G07F 17/3267 |
| 2018/0095542 | A1* | 4/2018 | Mallinson | G06T 19/006 |
| 2018/0284955 | A1* | 10/2018 | Canavor | G06F 16/29 |

\* cited by examiner

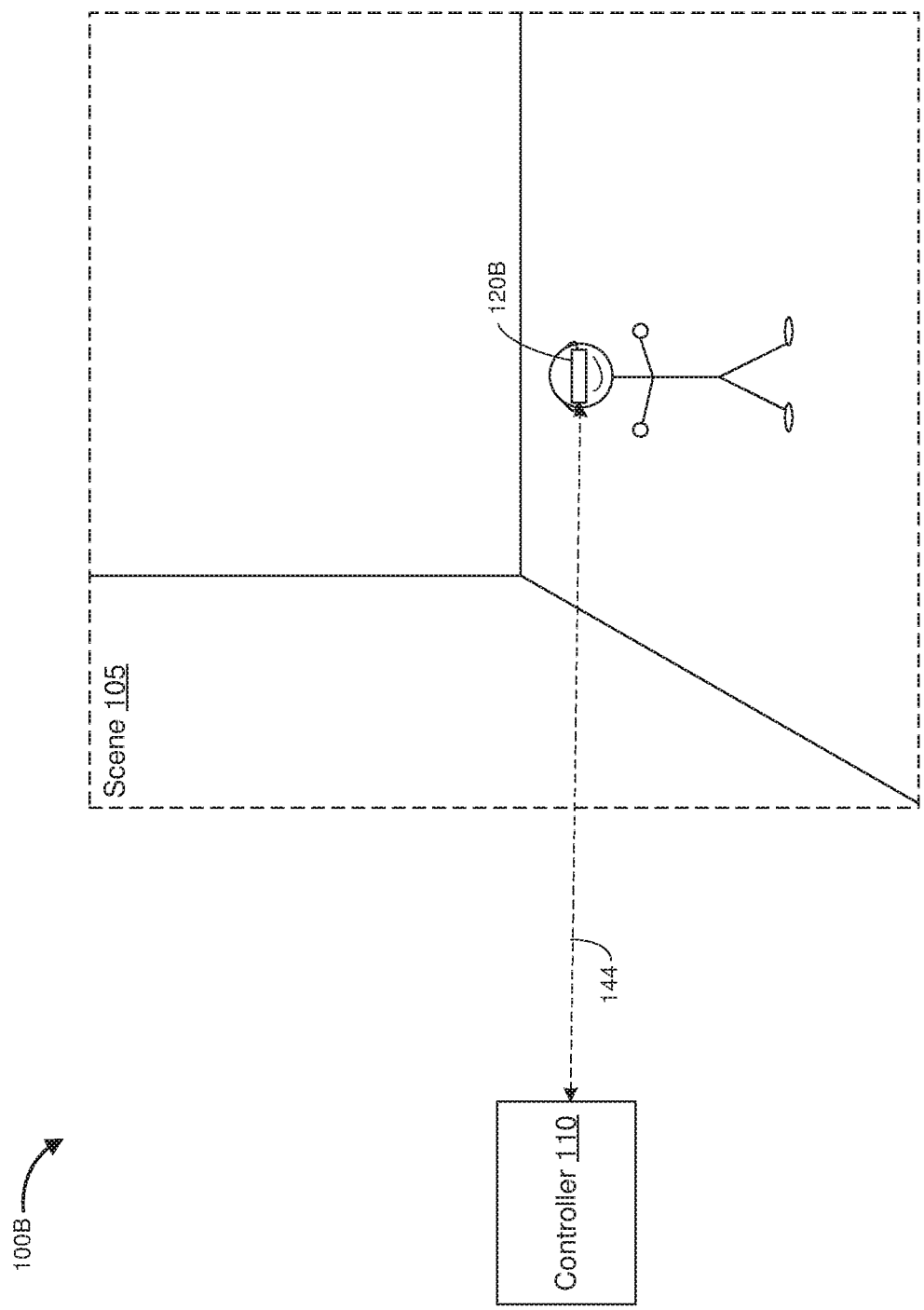

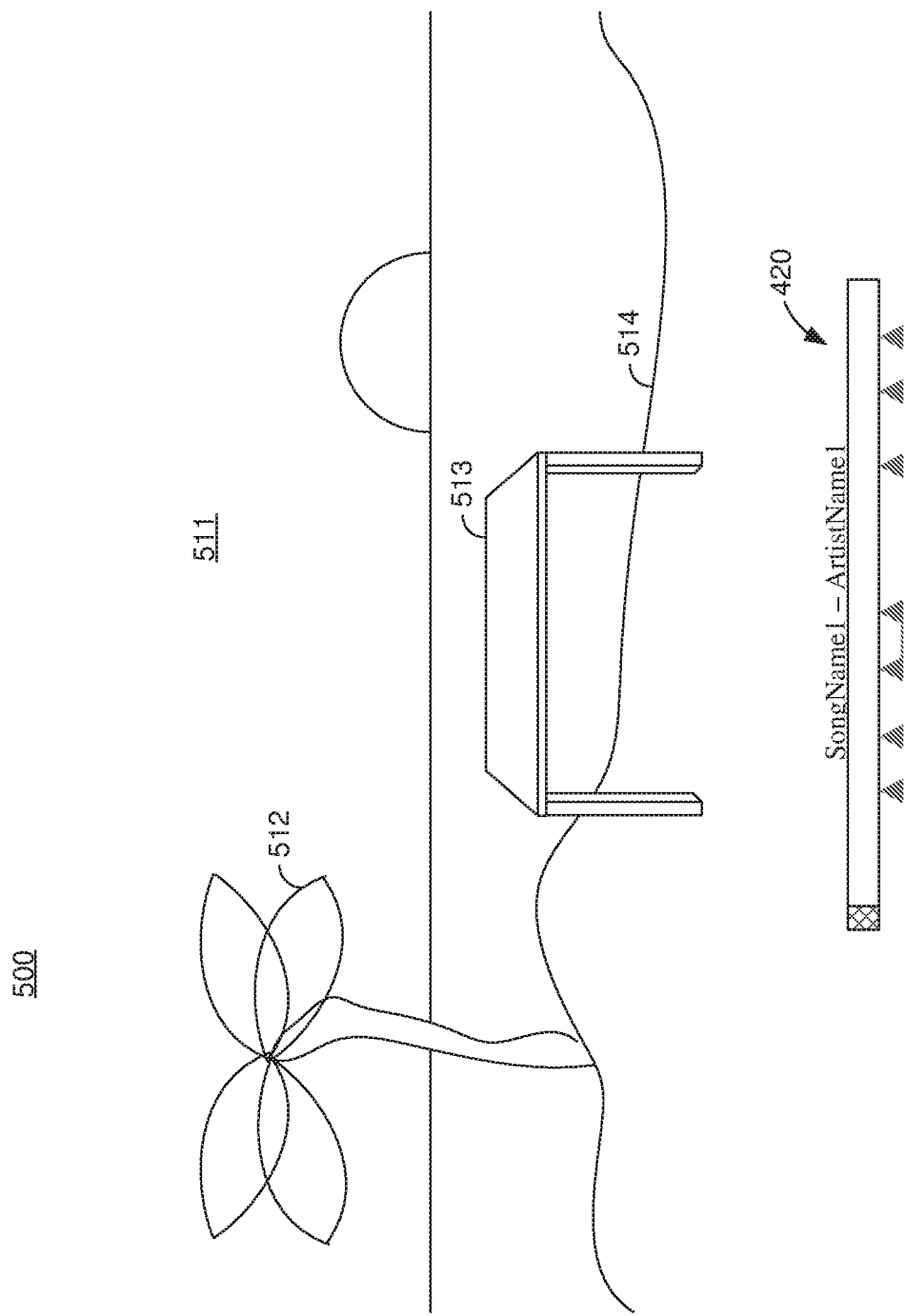

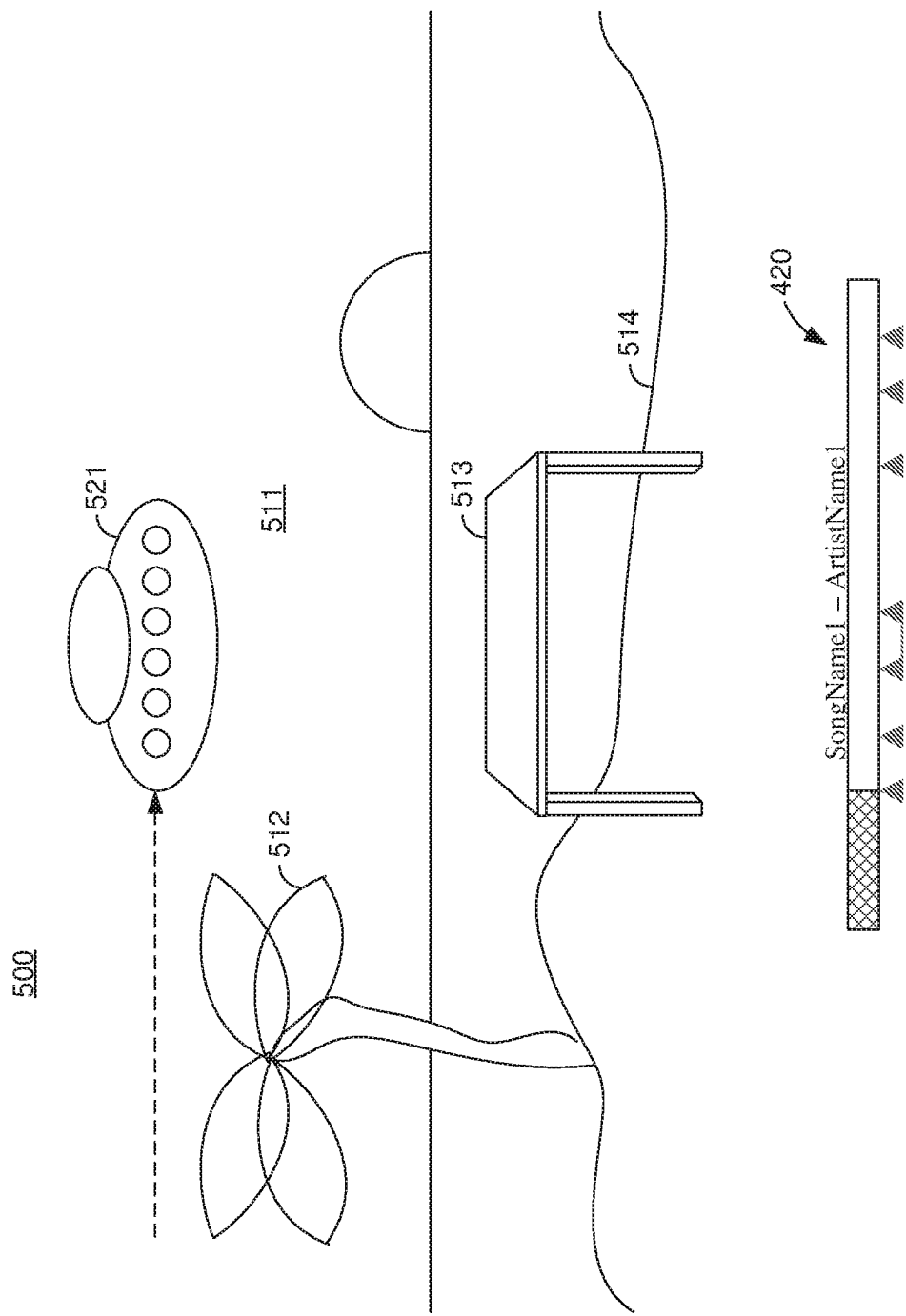

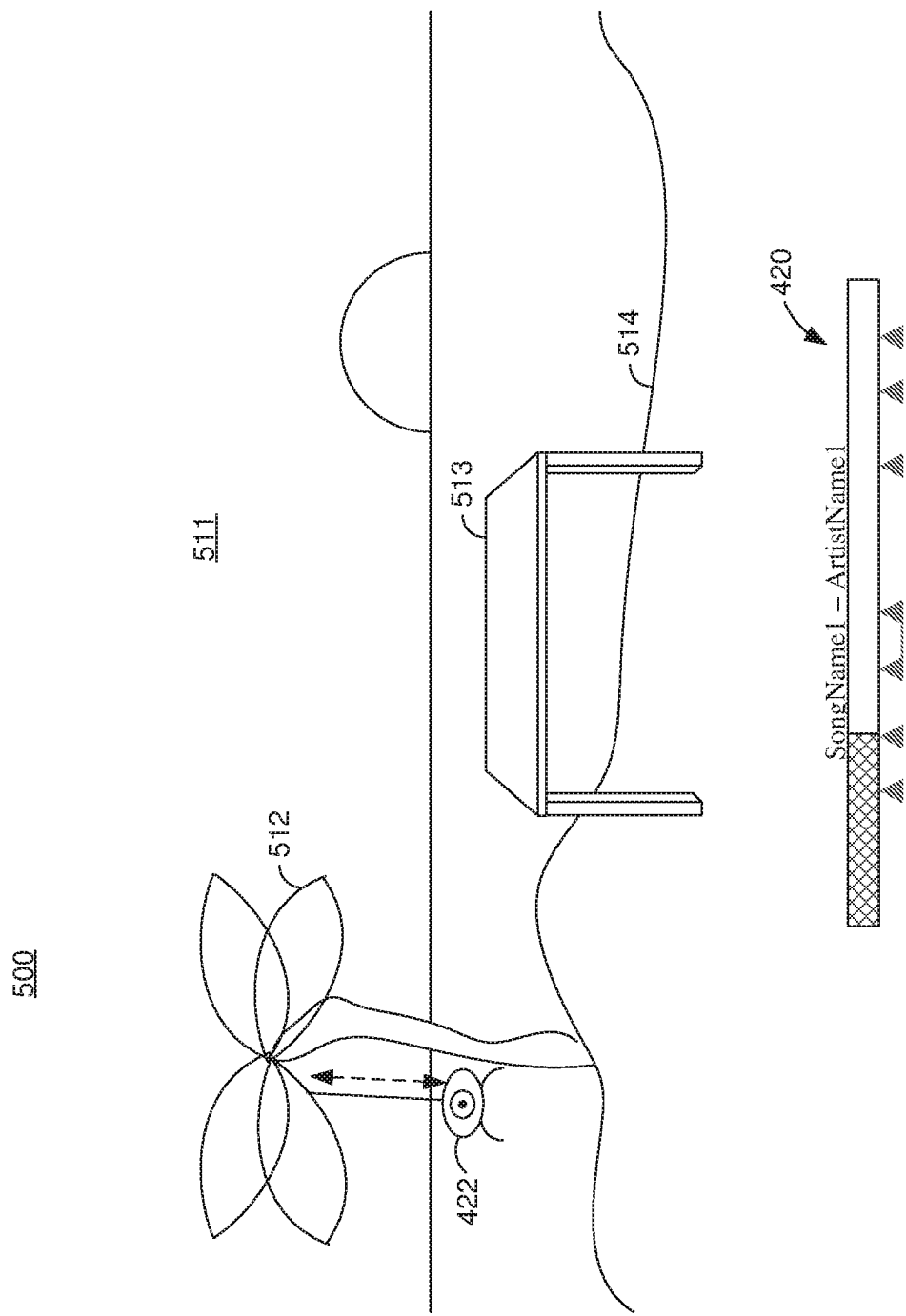

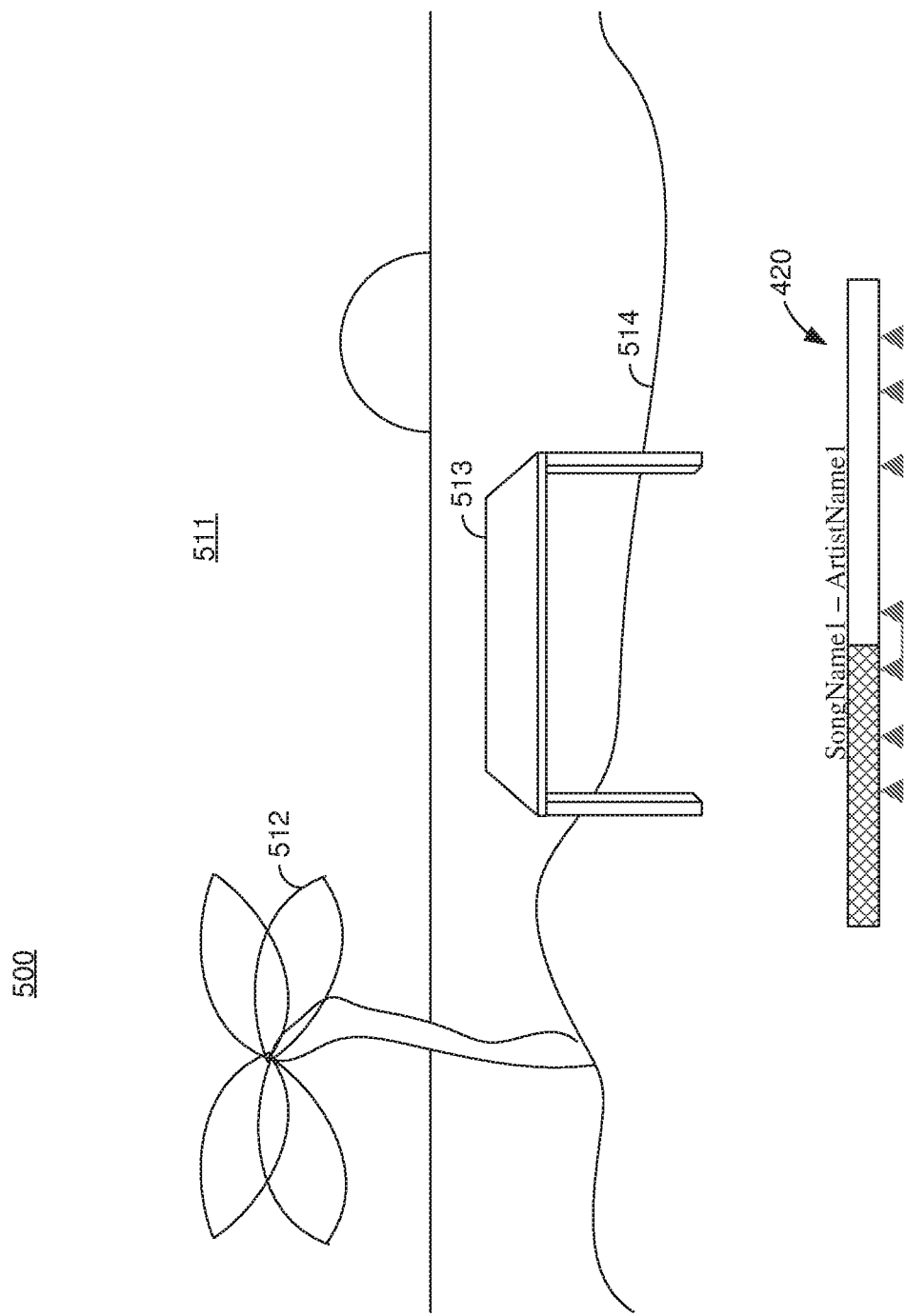

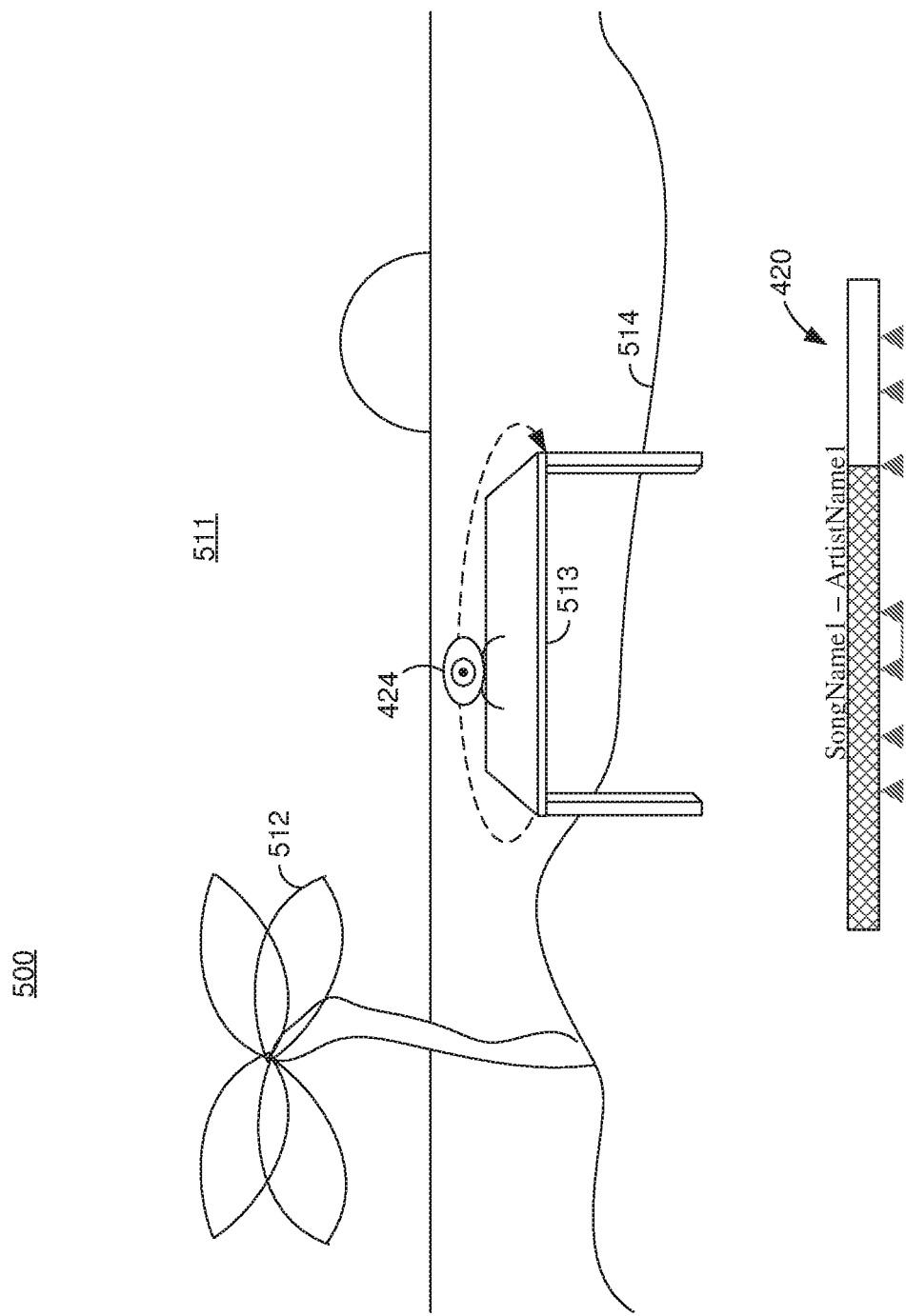

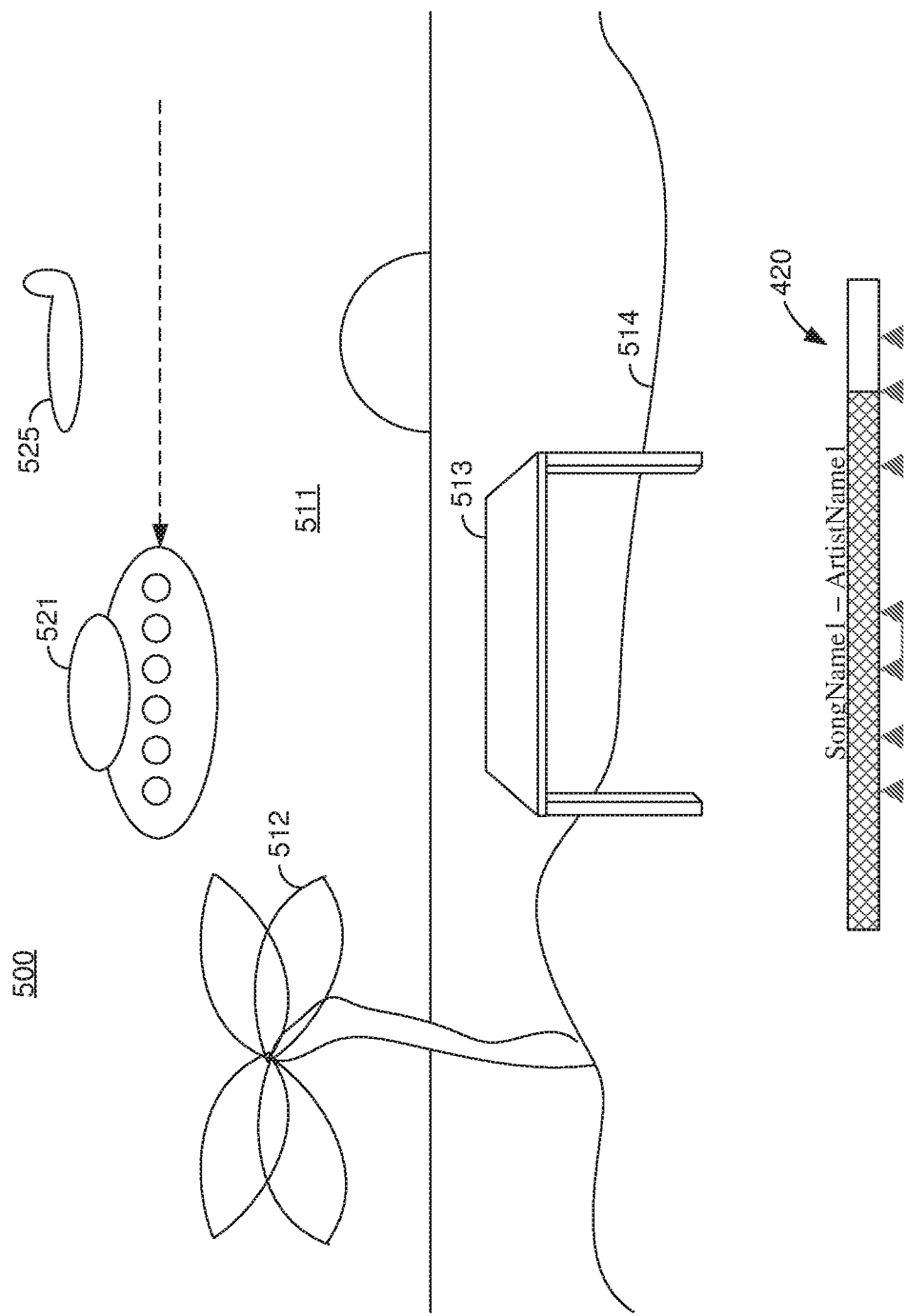

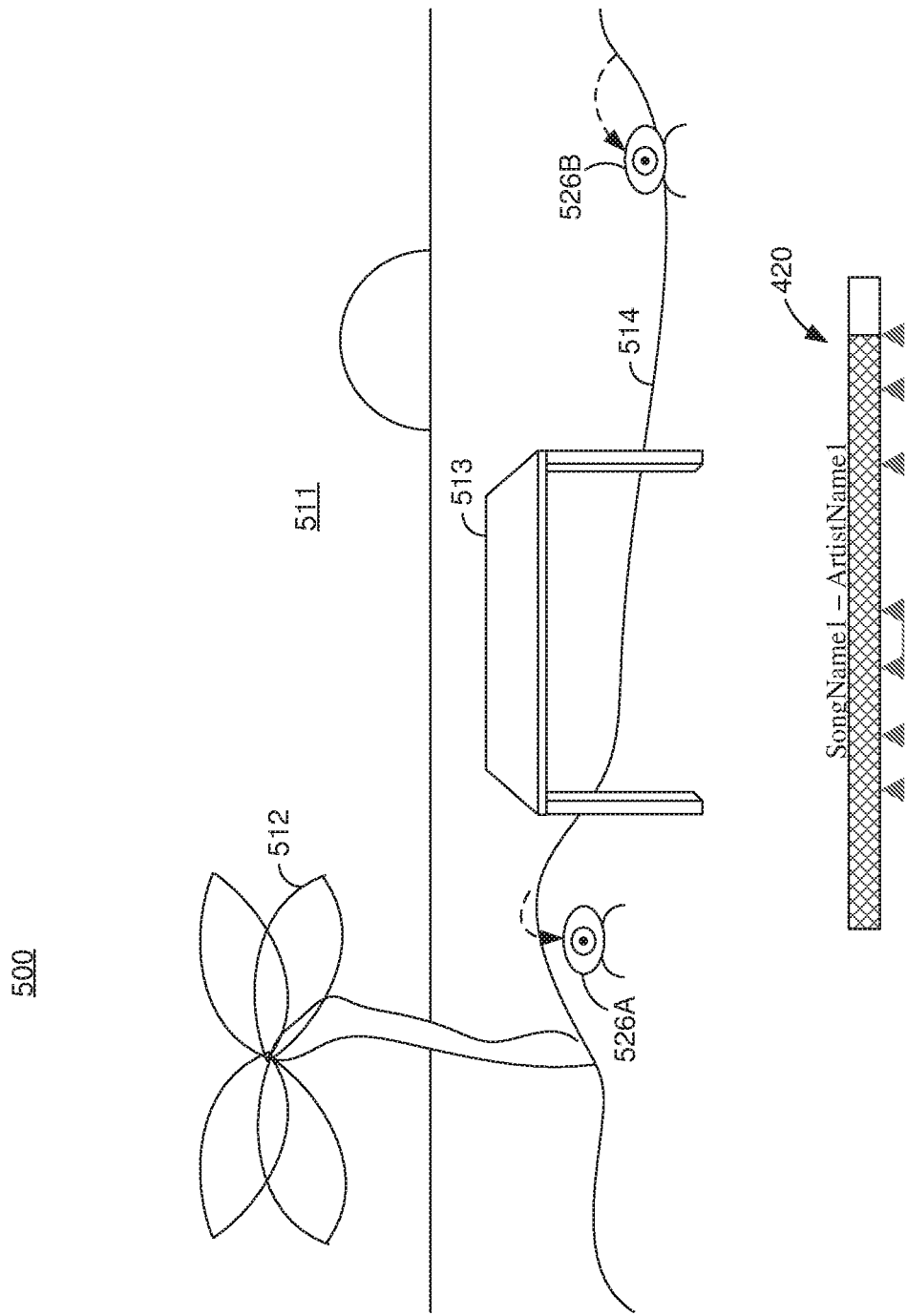

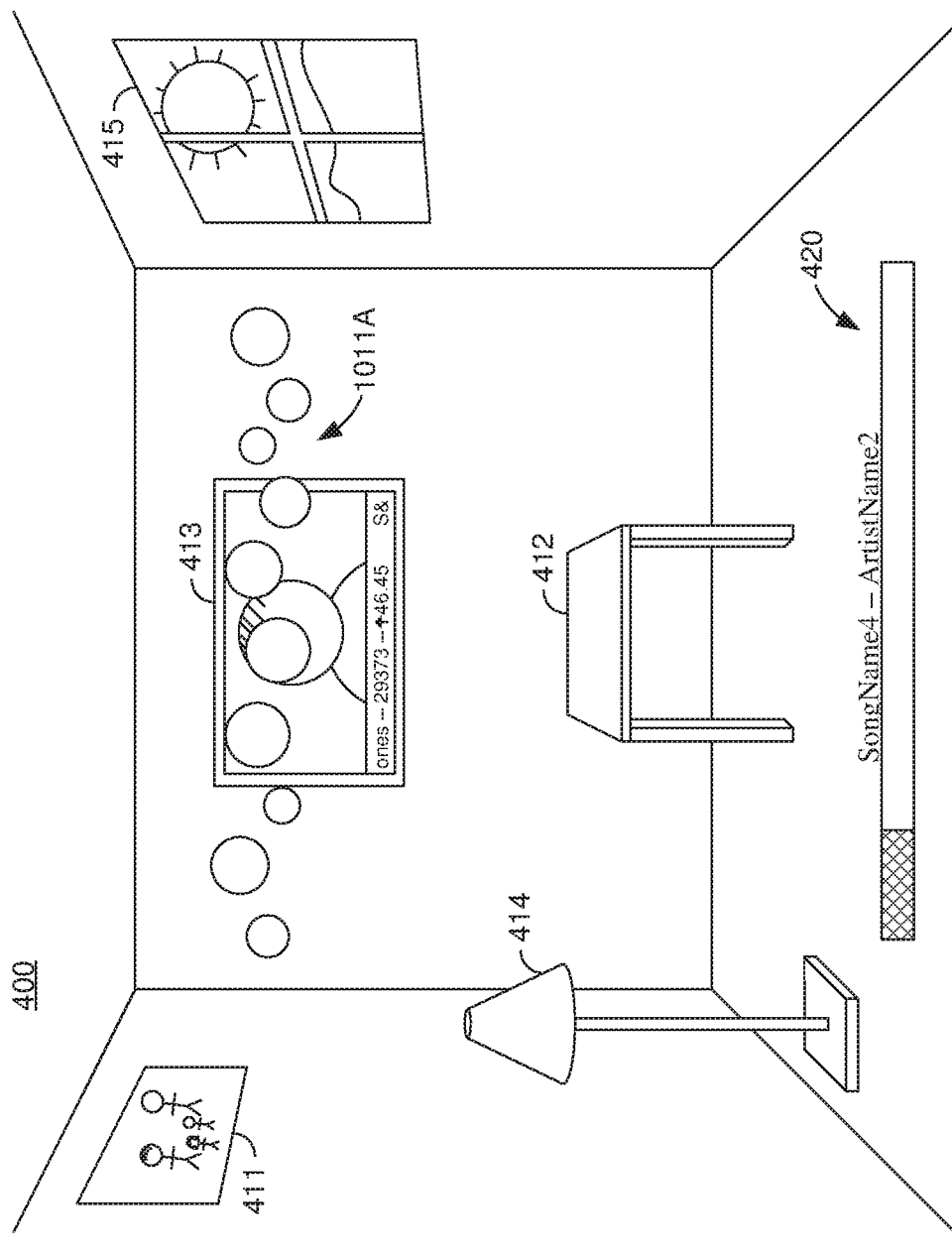

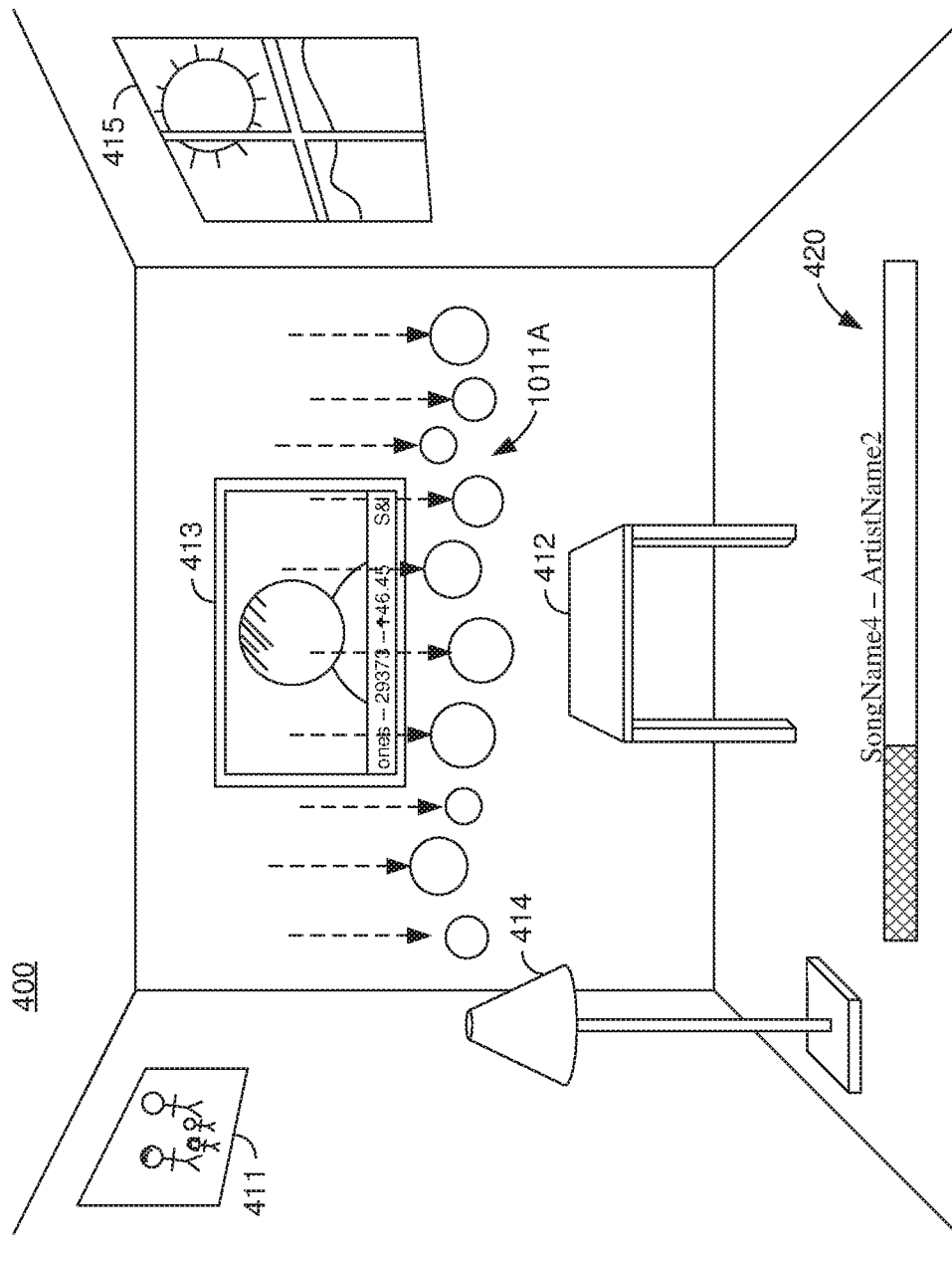

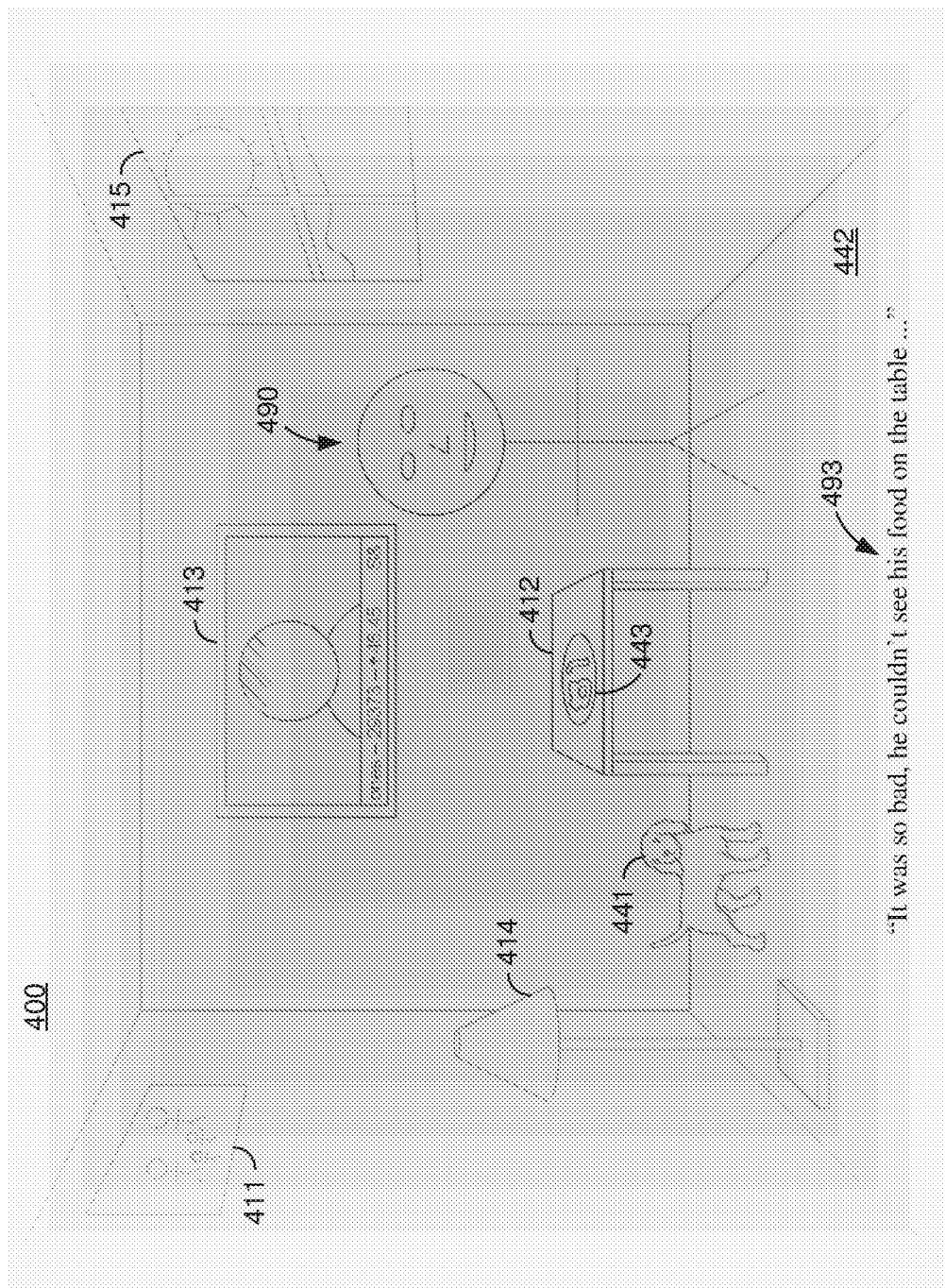

METHOD AND DEVICE FOR PRESENTING AN AUDIO AND SYNTHESIZED REALITY EXPERIENCE

CROSS-REFERENCES TO RELATED APPLICATIONS

This application is the national phase entry of Intl. Patent App. No. PCT/US2019/034324, filed on May 29, 2019, which claims priority to U.S. Provisional Patent App. No. 62/677,904, which are both hereby incorporated by reference in their entireties.

TECHNICAL FIELD

The present disclosure generally relates to audio and synthesized reality experiences, and in particular, to systems, methods, and devices for presenting a synthesized reality experience to accompany audio.

BACKGROUND

A physical setting refers to a world that individuals can sense and/or with which individuals can interact without assistance of electronic systems. Physical settings (e.g., a physical forest) include physical elements (e.g., physical trees, physical structures, and physical animals). Individuals can directly interact with and/or sense the physical setting, such as through touch, sight, smell, hearing, and taste.

In contrast, a synthesized reality (SR) setting refers to an entirely or partly computer-created setting that individuals can sense and/or with which individuals can interact via an electronic system. In SR, a subset of an individual's movements is monitored, and, responsive thereto, one or more attributes of one or more virtual objects in the SR setting is changed in a manner that conforms with one or more physical laws. For example, a SR system may detect an individual walking a few paces forward and, responsive thereto, adjust graphics and audio presented to the individual in a manner similar to how such scenery and sounds would change in a physical setting. Modifications to attribute(s) of virtual object(s) in a SR setting also may be made responsive to representations of movement (e.g., audio instructions).

An individual may interact with and/or sense a SR object using any one of his senses, including touch, smell, sight, taste, and sound. For example, an individual may interact with and/or sense aural objects that create a multi-dimensional (e.g., three dimensional) or spatial aural setting, and/or enable aural transparency. Multi-dimensional or spatial aural settings provide an individual with a perception of discrete aural sources in multi-dimensional space. Aural transparency selectively incorporates sounds from the physical setting, either with or without computer-created audio. In some SR settings, an individual may interact with and/or sense only aural objects.

One example of SR is virtual reality (VR). A VR setting refers to a simulated setting that is designed only to include computer-created sensory inputs for at least one of the senses. A VR setting includes multiple virtual objects with which an individual may interact and/or sense. An individual may interact and/or sense virtual objects in the VR setting through a simulation of a subset of the individual's actions within the computer-created setting, and/or through a simulation of the individual or his presence within the computer-created setting.

Another example of SR is mixed reality (MR). A MR setting refers to a simulated setting that is designed to integrate computer-created sensory inputs (e.g., virtual objects) with sensory inputs from the physical setting, or a representation thereof. On a reality spectrum, a mixed reality setting is between, and does not include, a VR setting at one end and an entirely physical setting at the other end.

In some MR settings, computer-created sensory inputs may adapt to changes in sensory inputs from the physical setting. Also, some electronic systems for presenting MR settings may monitor orientation and/or location with respect to the physical setting to enable interaction between virtual objects and real objects (which are physical elements from the physical setting or representations thereof). For example, a system may monitor movements so that a virtual plant appears stationery with respect to a physical building.

One example of mixed reality is augmented reality (AR). An AR setting refers to a simulated setting in which at least one virtual object is superimposed over a physical setting, or a representation thereof. For example, an electronic system may have an opaque display and at least one imaging sensor for capturing images or video of the physical setting, which are representations of the physical setting. The system combines the images or video with virtual objects, and displays the combination on the opaque display. An individual, using the system, views the physical setting indirectly via the images or video of the physical setting, and observes the virtual objects superimposed over the physical setting. When a system uses image sensor(s) to capture images of the physical setting, and presents the AR setting on the opaque display using those images, the displayed images are called a video pass-through. Alternatively, an electronic system for displaying an AR setting may have a transparent or semi-transparent display through which an individual may view the physical setting directly. The system may display virtual objects on the transparent or semi-transparent display, so that an individual, using the system, observes the virtual objects superimposed over the physical setting. In another example, a system may comprise a projection system that projects virtual objects into the physical setting. The virtual objects may be projected, for example, on a physical surface or as a holograph, so that an individual, using the system, observes the virtual objects superimposed over the physical setting.

An augmented reality setting also may refer to a simulated setting in which a representation of a physical setting is altered by computer-created sensory information. For example, a portion of a representation of a physical setting may be graphically altered (e.g., enlarged), such that the altered portion may still be representative of but not a faithfully-reproduced version of the originally captured image(s). As another example, in providing video pass-through, a system may alter at least one of the sensor images to impose a particular viewpoint different than the viewpoint captured by the image sensor(s). As an additional example, a representation of a physical setting may be altered by graphically obscuring or excluding portions thereof.

Another example of mixed reality is augmented virtuality (AV). An AV setting refers to a simulated setting in which a computer-created or virtual setting incorporates at least one sensory input from the physical setting. The sensory input(s) from the physical setting may be representations of at least one characteristic of the physical setting. For example, a virtual object may assume a color of a physical element captured by imaging sensor(s). In another example, a virtual object may exhibit characteristics consistent with actual weather conditions in the physical setting, as identified via imaging, weather-related sensors, and/or online weather data. In yet another example, an augmented reality forest may have virtual trees and structures, but the animals may have features that are accurately reproduced from images taken of physical animals.

Many electronic systems enable an individual to interact with and/or sense various SR settings. One example includes head mounted systems. A head mounted system may have an opaque display and speaker(s). Alternatively, a head mounted system may be designed to receive an external display (e.g., a smartphone). The head mounted system may have imaging sensor(s) and/or microphones for taking images/video and/or capturing audio of the physical setting, respectively. A head mounted system also may have a transparent or semi-transparent display. The transparent or semi-transparent display may incorporate a substrate through which light representative of images is directed to an individual's eyes. The display may incorporate LEDs, OLEDs, a digital light projector, a laser scanning light source, liquid crystal on silicon, or any combination of these technologies. The substrate through which the light is transmitted may be a light waveguide, optical combiner, optical reflector, holographic substrate, or any combination of these substrates. In one embodiment, the transparent or semi-transparent display may transition selectively between an opaque state and a transparent or semi-transparent state. In another example, the electronic system may be a projection-based system. A projection-based system may use retinal projection to project images onto an individual's retina. Alternatively, a projection system also may project virtual objects into a physical setting (e.g., onto a physical surface or as a holograph). Other examples of SR systems include heads up displays, automotive windshields with the ability to display graphics, windows with the ability to display graphics, lenses with the ability to display graphics, headphones or earphones, speaker arrangements, input mechanisms (e.g., controllers having or not having haptic feedback), tablets, smartphones, and desktop or laptop computers. While music is typically an audio experience, the lyrical content, sound dynamics, or other features lend themselves to a supplemental visual experience. Previously available audiovisual experiences, such as music videos and/or algorithmic audio visualizations, are not truly immersive and/or are not tailored to a user environment.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 1B is a block diagram of an example operating architecture in accordance with some implementations.

FIGS. 5A-5G illustrate another SR volumetric environment during playback of the first audio file in accordance with some implementations.

FIGS. 10A-10E illustrate the SR volumetric environment of FIG. 4A during playback of a fourth audio file in accordance with some implementations.

FIGS. 12A-12E illustrate the SR volumetric environment of FIG. 4A during a story told by a storyteller in accordance with some implementations.

Figure 1A:
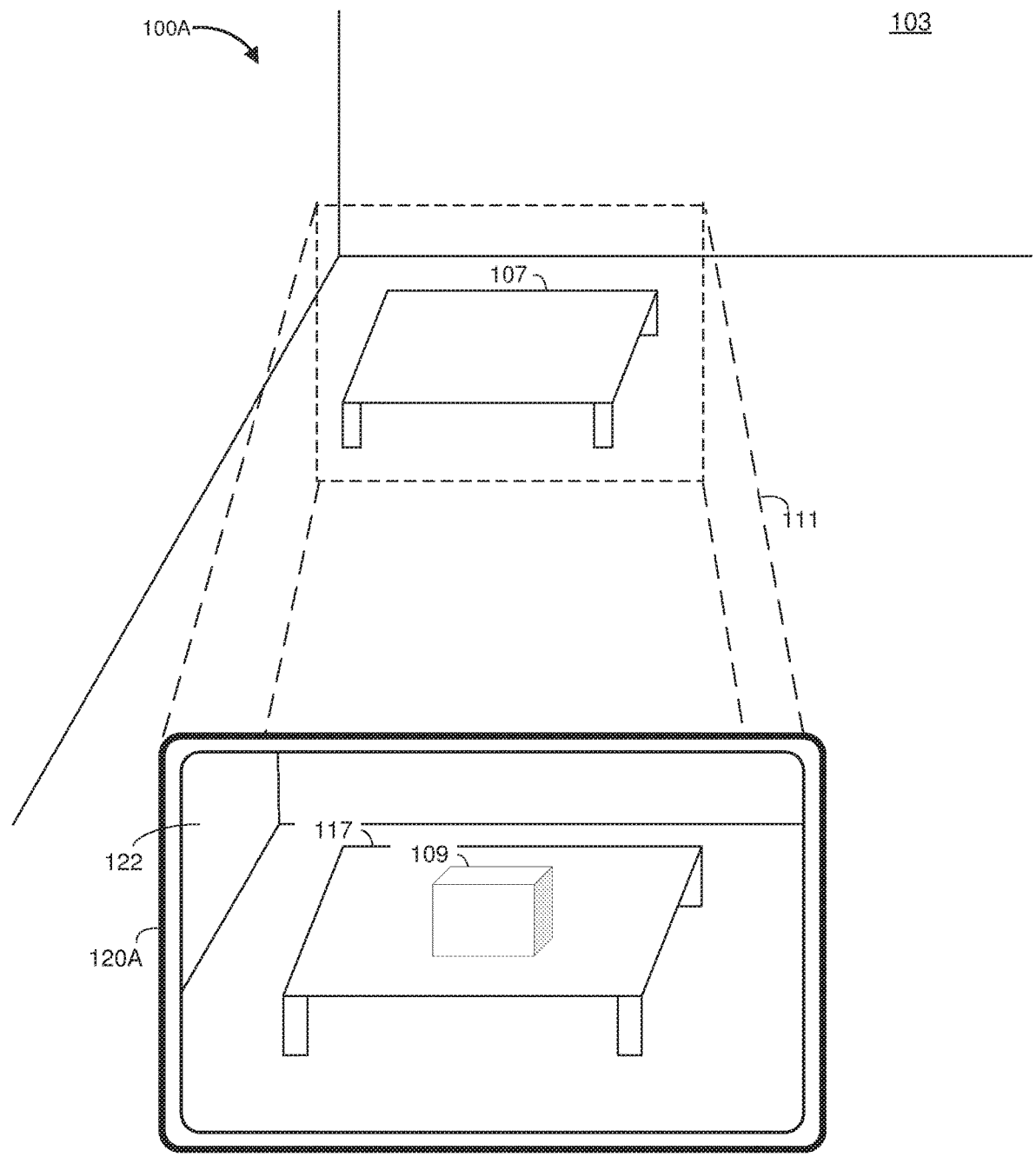
FIG. 1A is a block diagram of an example operating architecture in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for presenting an audio/SR experience. In various implementations, a first method is performed by a device including one or more processors, non-transitory memory, a speaker, and a display. The method includes storing, in the non-transitory memory, an audio file having an associated timeline. The method includes storing, in the non-transitory memory in association with the audio file, a plurality of SR content events, wherein each of the plurality of SR content events is associated with a respective temporal criterion and a respective environmental criterion. While playing, via the speaker, the audio file, the method includes determining, using the processor, that the respective temporal criterion of a particular one of the plurality of SR content events is met based on a current position in the timeline of the audio file. While playing, via the speaker, the audio file, the method includes determining, using the processor, that the respective environmental criterion of the particular one of the plurality of SR events is met based on environment data of an environment. While playing, via the speaker, the audio file, the method includes, in response to determining that the respective temporal criterion and the respective environmental criterion of the particular one of the plurality of SR content events are met, displaying, on the display, the particular one of the plurality of SR content events in association with the environment.

In various implementations, a second method is performed by a device including one or more processors, non-transitory memory, a speaker, and a display. The method includes obtaining a three-dimensional (3D) point cloud for an environment. The method includes obtaining SR content based on an audio file and the 3D point cloud for the environment. The method includes concurrently playing, via the speaker, the audio file and displaying, on the display, the SR content in association with the environment.

In various implementations, a third method is performed by a device including one or more processors, non-transitory memory, a microphone, and a display. The method includes recording, via the microphone, a real sound produced in an environment. The method includes detecting, using the one or more processors, one or more spoken words in the real sound. The method includes obtaining, based on the one or more spoken words, SR content. The method includes displaying, on the display, the SR content in association with the environment.

In accordance with some implementations, a device includes one or more processors, a non-transitory memory, and one or more programs; the one or more programs are stored in the non-transitory memory and configured to be executed by the one or more processors. The one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices, and circuits have not been described in exhaustive detail so as not to obscure more pertinent aspects of the example implementations described herein.

As noted above, previously available audiovisual experiences, such as music videos and/or algorithmic audio visualizations, are not truly immersive and/or are not tailored to a user environment. Accordingly, in various implementations described herein, an audio/SR experience is presented. In various implementations described herein, a timeline of an audio file is associated with curated SR content events that are displayed based on analysis of the user environment. In various implementations, SR content is obtained on-the-fly and presented in the user environment during playback of an audio file based on analysis of the audio file (e.g., the audio or metadata [lyrics, title, artist, etc.]). In various implementations, SR content is presented based on spoken words detected in audio heard by the user.

FIG. 1A is a block diagram of an example operating architecture 100A in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating architecture 100A includes an electronic device 120A.

In some implementations, the electronic device 120A is configured to present CGR content to a user. In some implementations, the electronic device 120A includes a suitable combination of software, firmware, and/or hardware. According to some implementations, the electronic device 120A presents, via a display 122, SR content to the user while the user is physically present within a physical environment 103 that includes a table 107 within the field-of-view 111 of the electronic device 120A. As such, in some implementations, the user holds the electronic device 120A in his/her hand(s). In some implementations, while providing augmented reality (AR) content, the electronic device 120A is configured to display an AR object (e.g., an AR cube 109) and to enable video pass-through of the physical environment 103 (e.g., including a representation 117 of the table 107) on a display 122.

FIG. 1B is a block diagram of an example operating architecture 100B in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating architecture 100B includes a controller 110 and a head-mounted device (HMD) 120B.

In some implementations, the controller 110 is configured to manage and coordinate presentation of SR content for the user. In some implementations, the controller 110 includes a suitable combination of software, firmware, and/or hardware. The controller 110 is described in greater detail below with respect to FIG. 2. In some implementations, the controller 110 is a computing device that is local or remote relative to the scene 105. For example, the controller 110 is a local server located within the scene 105. In another example, the controller 110 is a remote server located outside of the scene 105 (e.g., a cloud server, central server, etc.). In some implementations, the controller 110 is communicatively coupled with the HMD 120B via one or more wired or wireless communication channels 144 (e.g., BLUETOOTH, IEEE 802.11x, IEEE 802.16x, IEEE 802.3x, etc.). In another example, the controller 110 is included within the enclosure of the HMD 120B.

In some implementations, the HMD 120B is configured to present the SR content to the user. In some implementations, the HMD 120B includes a suitable combination of software, firmware, and/or hardware. The HMD 120B is described in greater detail below with respect to FIG. 3. In some implementations, the functionalities of the controller 110 are provided by and/or combined with the HMD 120B.

According to some implementations, the HMD 120B presents SR content to the user while the user is virtually and/or physically present within the scene 105.

In some implementations, the user wears the HMD 120B on his/her head. As such, the HMD 120B includes one or more SR displays provided to display SR content. For example, in various implementations, the HMD 120B encloses the field-of-view of the user. In some implementations, such as in FIG. 1A, the HMD 120B is replaced with a handheld device (such as a smartphone or tablet) configured to present SR content, and rather than wearing the HMD 120B the user holds the device with a display directed towards the field-of-view of the user and a camera directed towards the scene 105. In some implementations, the handheld device can be placed within an enclosure that can be worn on the head of the user. In some implementations, the HMD 120B is replaced with a SR chamber, enclosure, or room configured to present SR content in which the user does not wear or hold the HMD 120B.

Figure 2:
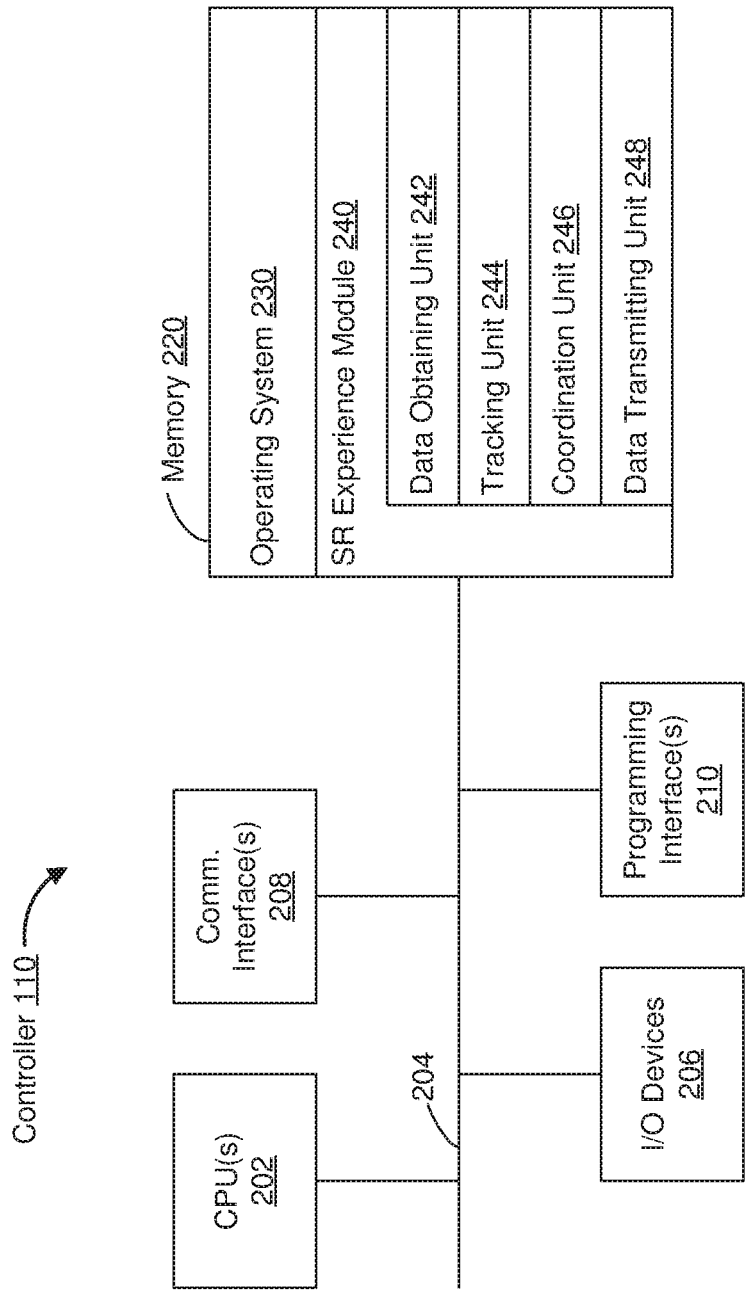
FIG. 2 is a block diagram of an example controller in accordance with some implementations.

FIG. 2 is a block diagram of an example of the controller 110 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some implementations, the one or more communication buses 204 include circuitry that interconnects and controls communications between system components. In some implementations, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some implementations, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some implementations, the memory 220 or the non-transitory computer readable storage medium of the memory 220 stores the following programs, modules and data structures, or a subset thereof including an optional operating system 230 and an SR experience module 240.

The operating system 230 includes procedures for handling various basic system services and for performing hardware dependent tasks. In some implementations, the SR experience module 240 is configured to manage and coordinate one or more SR experiences for one or more users (e.g., a single SR experience for one or more users, or multiple SR experiences for respective groups of one or more users). To that end, in various implementations, the SR experience module 240 includes a data obtaining unit 242, a tracking unit 244, a coordination unit 246, and a data transmitting unit 248.

In some implementations, the data obtaining unit 242 is configured to obtain data (e.g., presentation data, interaction data, sensor data, location data, etc.) from at least the HMD 120B. To that end, in various implementations, the data obtaining unit 242 includes instructions and/or logic therefor, and heuristics and metadata therefor.

In some implementations, the tracking unit 244 is configured to map the scene 105 and to track the position/location of at least the HMD 120B with respect to the scene 105. To that end, in various implementations, the tracking unit 244 includes instructions and/or logic therefor, and heuristics and metadata therefor.

In some implementations, the coordination unit 246 is configured to manage and coordinate the SR experience presented to the user by the HMD 120B. To that end, in various implementations, the coordination unit 246 includes instructions and/or logic therefor, and heuristics and metadata therefor.

In some implementations, the data transmitting unit 248 is configured to transmit data (e.g., presentation data, location data, etc.) to at least the HMD 120B. To that end, in various implementations, the data transmitting unit 248 includes instructions and/or logic therefor, and heuristics and metadata therefor.

Although the data obtaining unit 242, the tracking unit 244, the coordination unit 246, and the data transmitting unit 248 are shown as residing on a single device (e.g., the controller 110), it should be understood that in other implementations, any combination of the data obtaining unit 242, the tracking unit 244, the coordination unit 246, and the data transmitting unit 248 may be located in separate computing devices.

Moreover, FIG. 2 is intended more as functional description of the various features that may be present in a particular implementation as opposed to a structural schematic of the implementations described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 3:
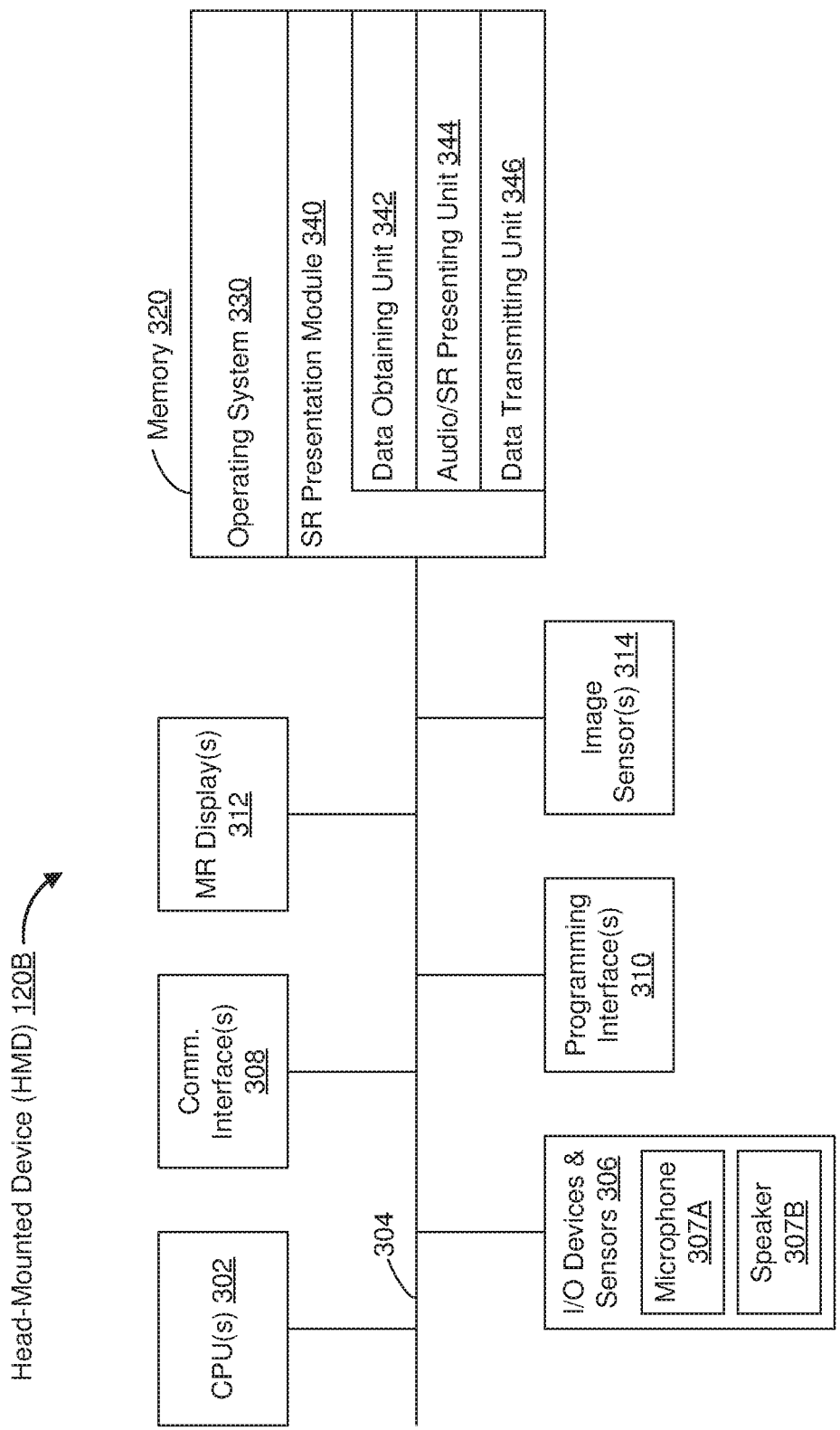
FIG. 3 is a block diagram of an example head-mounted device (HMD) in accordance with some implementations.

FIG. 3 is a block diagram of an example of the HMD 120B in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the HMD 120B includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more SR displays 312, one or more interior and/or exterior facing image sensors 314, a memory 320, and one or more communication buses 304 for interconnecting these and various other components.

In some implementations, the one or more communication buses 304 include circuitry that interconnects and controls communications between system components. In some implementations, the one or more I/O devices and sensors 306 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones 307A, one or more speakers 307B (e.g., headphones or loudspeakers), a haptics engine, one or more depth sensors (e.g., a structured light, a time-of-flight, or the like), and/or the like.

In some implementations, the one or more SR displays 312 are configured to provide the SR experience to the user. In some implementations, the one or more SR displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some implementations, the one or more SR displays 312 correspond to diffractive, reflective, polarized, holographic, etc. waveguide displays. For example, the HMD 120B includes a single SR display. In another example, the HMD 120B includes an SR display for each eye of the user. In some implementations, the one or more SR displays 312 are capable of presenting AR and VR content.

In some implementations, the one or more image sensors 314 are configured to obtain image data that corresponds to at least a portion of the face of the user that includes the eyes of the user (any may be referred to as an eye-tracking camera). In some implementations, the one or more image sensors 314 are configured to be forward-facing so as to obtain image data that corresponds to the scene as would be viewed by the user if the HMD 120B was not present (and may be referred to as a scene camera). The one or more image sensors 314 can include one or more RGB cameras (e.g., with a complimentary metal-oxide-semiconductor (CMOS) image sensor or a charge-coupled device (CCD) image sensor), one or more infrared (IR) cameras, one or more event-based cameras, and/or the like.

The memory 320 includes high-speed random-access memory, such as DRAM, SRAM, DDR RAM, or other random-access solid-state memory devices. In some implementations, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some implementations, the memory 320 or the non-transitory computer readable storage medium of the memory 320 stores the following programs, modules and data structures, or a subset thereof including an optional operating system 330 and an SR presentation module 340.

The operating system 330 includes procedures for handling various basic system services and for performing hardware dependent tasks. In some implementations, the SR presentation module 340 is configured to present SR content to the user via the one or more SR displays 312. To that end, in various implementations, the SR presentation module 340 includes a data obtaining unit 342, an audio/SR presenting unit 344, and a data transmitting unit 348.

In some implementations, the data obtaining unit 342 is configured to obtain data (e.g., presentation data, interaction data, sensor data, location data, etc.) from one or more of the controller 110 (e.g., via the communication interface 308), the I/O devices and sensors 306, or the one or more image sensors 314. To that end, in various implementations, the data obtaining unit 342 includes instructions and/or logic therefor, and heuristics and metadata therefor.

In some implementations, the audio/SR presenting unit 344 is configured to present an audio/SR experience via the one or more SR displays 312 (and, in various implementations, the speaker 307B and/or microphone 307A). To that end, in various implementations, the SR presenting unit 344 includes instructions and/or logic therefor, and heuristics and metadata therefor.

In some implementations, the data transmitting unit 346 is configured to transmit data (e.g., presentation data, location data, etc.) to at least the controller 110. To that end, in various implementations, the data transmitting unit 346 includes instructions and/or logic therefor, and heuristics and metadata therefor.

Although the data obtaining unit 342, the audio/SR presenting unit 344, and the data transmitting unit 346 are shown as residing on a single device (e.g., the HMD 120B), it should be understood that in other implementations, any combination of the data obtaining unit 342, the audio/SR presenting unit 344, and the data transmitting unit 346 may be located in separate computing devices.

Moreover, FIG. 3 is intended more as a functional description of the various features that could be present in a particular implementation as opposed to a structural schematic of the implementations described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 4A:
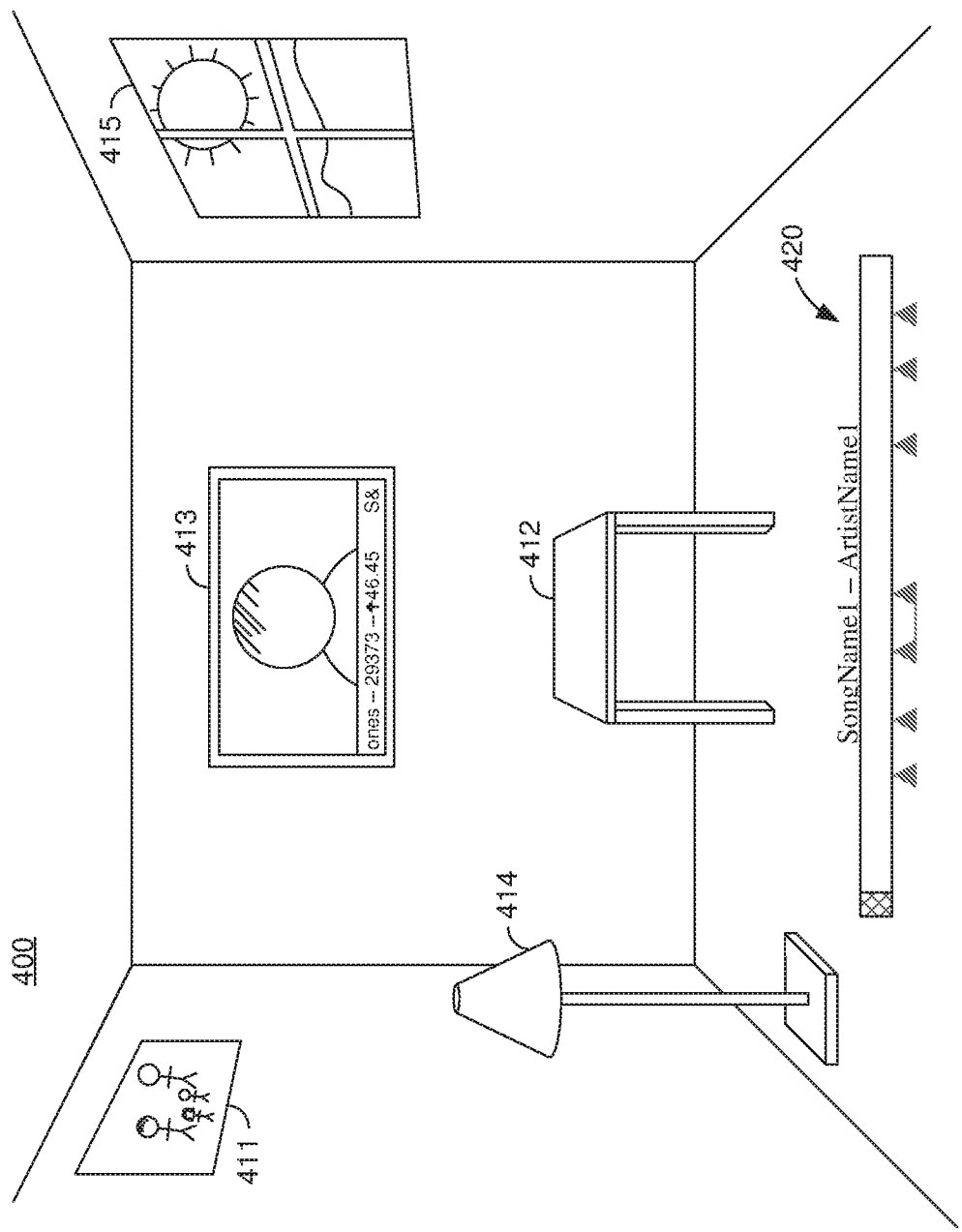
FIGS. 4A-4G illustrate an SR volumetric environment during playback of a first audio file in accordance with some implementations.

FIG. 4A illustrates a SR volumetric environment 400 based on a real environment surveyed by a scene camera of a device. In various implementations, the scene camera is part of a device that is worn by the user and includes a display that displays the SR volumetric environment 400. Thus, in various implementations, the user is physically present in the environment. In various implementations, the scene camera is part of remote device (such as a drone or robotic avatar) that transmits images from the scene camera to a local device that is worn by the user and includes a display that displays the SR volumetric environment 400.

FIG. 4A illustrates the SR volumetric environment 400 at a first time during playback of a first audio file (e.g., a song entitled "SongName1" by an artist named "ArtistName1").

The SR volumetric environment 400 includes a plurality of objects, including one or more real objects (e.g., a photograph 411, a table 412, a television 413, a lamp 414, and a window 415) and one or more virtual objects (an audio playback indicator 420). In various implementations, each object is displayed at a location in the SR volumetric environment 400, e.g., at a location defined by three coordinates in a three-dimensional (3D) SR coordinate system. Accordingly, when the user moves in the SR volumetric environment 400 (e.g., changes either position and/or orientation), the objects are moved on the display of the HMD, but retain their location in the SR volumetric environment 400. In various implementations, certain virtual objects (such as the audio playback indicator 420) are displayed at locations on the display such that when the user moves in the SR volumetric environment 400, the objects are stationary on the display on the HMD.

The audio playback indicator 420 includes information regarding playback of an audio file. In various implementations, the audio file is associated with a timeline such that, at various times, various portions of the audio file are played. In various implementations, the audio playback indicator 420 includes text, such as an artist associated with the audio file and/or a title associated with the audio file. In various implementations, the audio playback indicator 420 includes an audio progress bar that indicates the current position in the timeline of the audio file being played. In various implementations, the audio playback indicator 420 includes event indicia indicating temporal criteria of SR content events. Although the audio playback indicator 420 is displayed in FIG. 4A, in various implementations, the audio playback indicator 420 is not displayed, even though an audio file is being played.

Figure 4B:
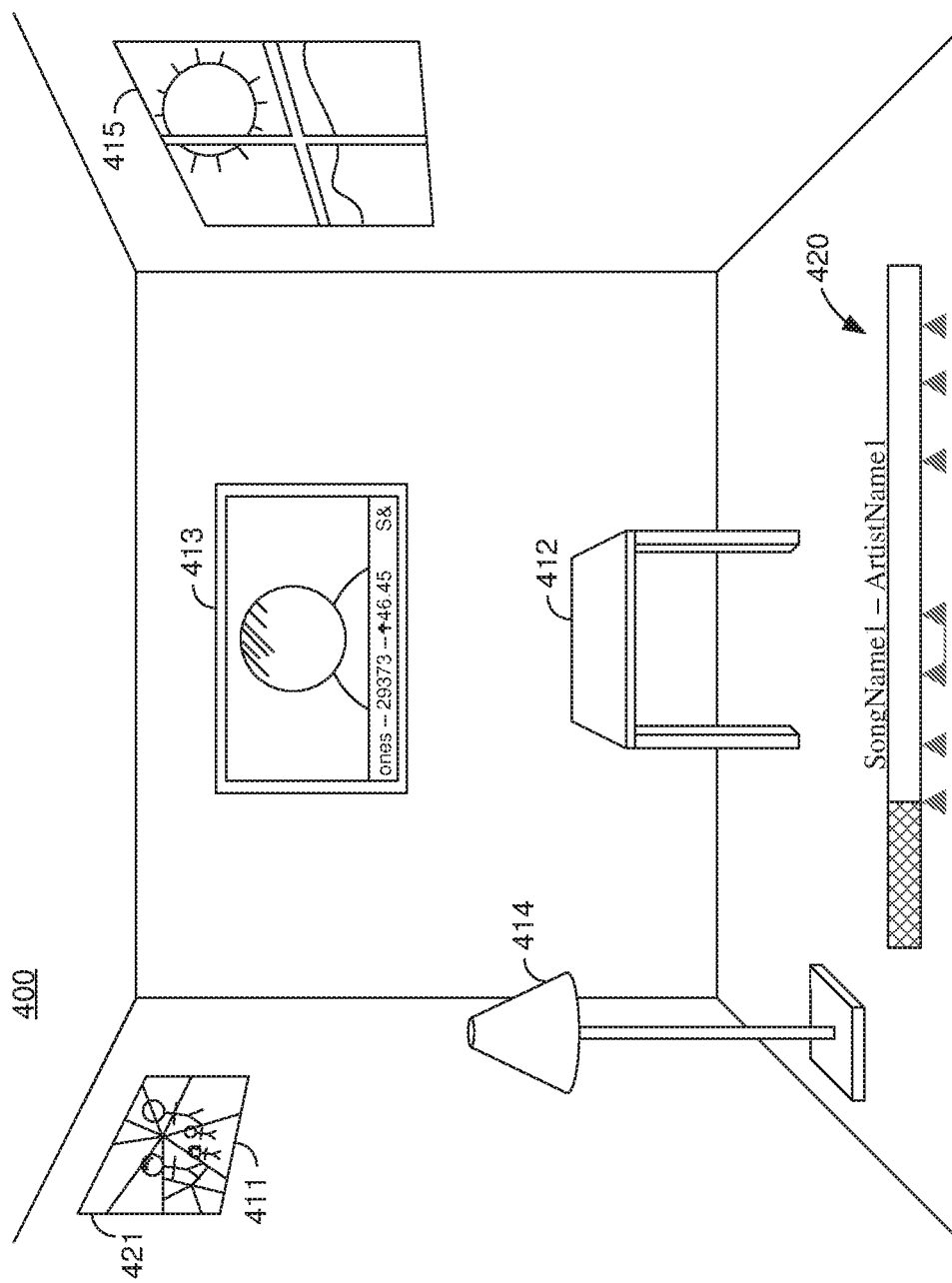

FIG. 4B illustrates the SR volumetric environment 400 of FIG. 4A at a second time during playback of the first audio file. In response to determining that a first temporal criterion of a first SR content event and a first environmental criterion of the first SR content event are met, the SR volumetric environment 400 includes the first SR content event. The first temporal criterion of the first SR content event is met when the current position in the timeline of the first audio file matches a trigger time (e.g. indicated by the first event indicium of the audio playback indicator 420). The first environmental criterion of the first SR content event is met when the SR volumetric environment 400 includes a square object with a particular reflectiveness. In FIG. 4B, the first environmental criterion is met because the SR volumetric environment 400 includes the photograph 411. In other implementations, the first environmental criterion is met because the SR volumetric environment includes a digital picture frame or a framed diploma. Displaying the first SR content event includes displaying a virtual object (e.g., breaking glass 421) over the square object with the particular reflectiveness.

Figure 4C:
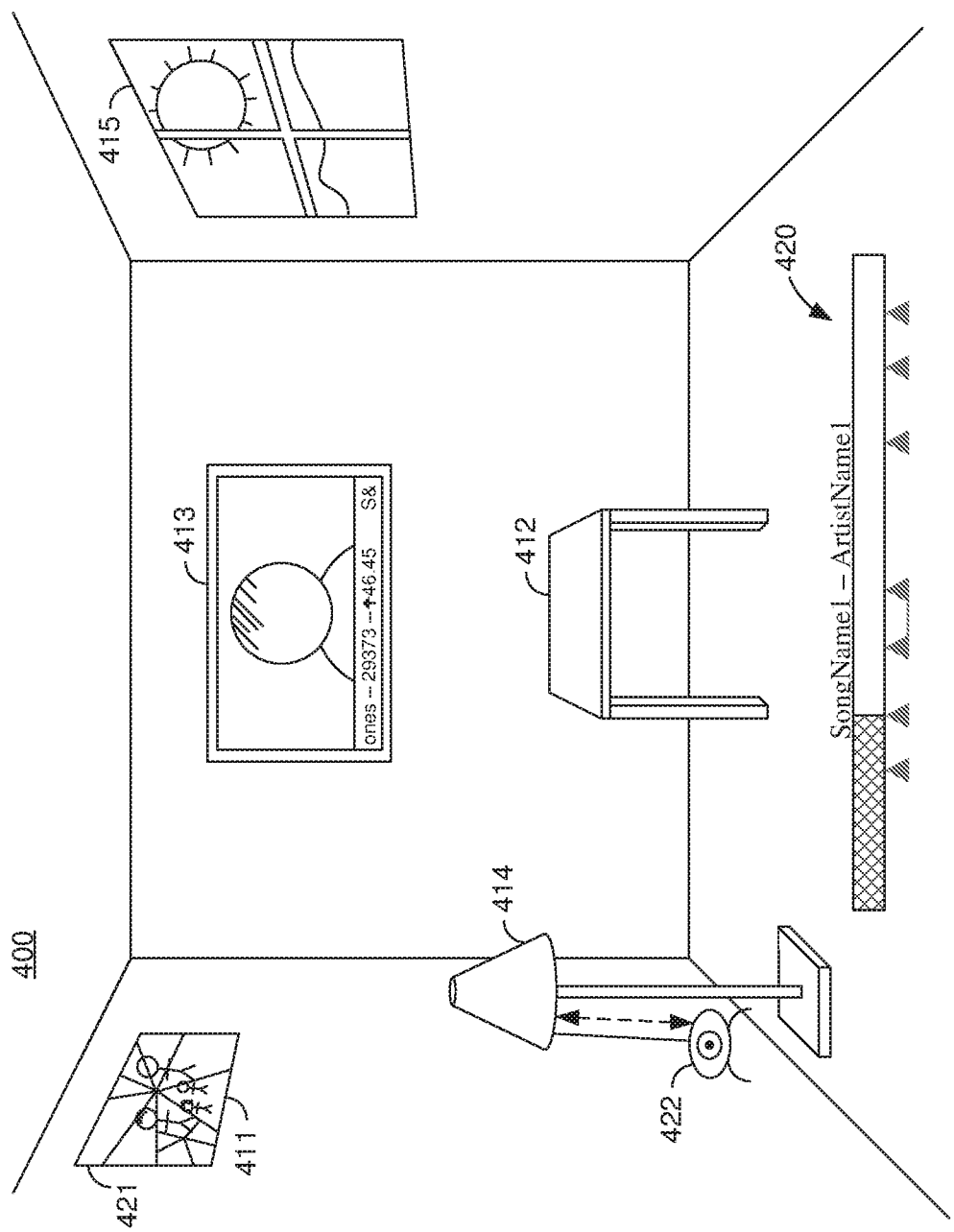

FIG. 4C illustrates the SR volumetric environment 400 of FIG. 4A at a third time during playback of the first audio file. In response to determining that a second temporal criterion of a second SR content event and a second environmental criterion of the second SR content event are met, the SR volumetric environment 400 includes the second SR content event. The second temporal criterion of the second SR content event is met when the current position in the timeline of the first audio file matches a trigger time (e.g. indicated by the second event indicium of the audio playback indicator 420). The second environmental criterion of the second SR content event is met when the SR volumetric environment 400 includes an object of a particular shape having a long, skinny portion topped by a larger portion. In FIG. 4C, the second environmental criterion is met because the SR volumetric environment 400 includes the lamp 414. In other implementations, the second environmental criterion is met because the SR volumetric environment includes a tree, a sculpture, or a person wearing a large hat. Displaying the second SR content event includes displaying a virtual object (e.g., an alien 422) dropping out from within or behind the larger portion of the object of the particular shape and retreating into and hiding in or behind the larger portion.

Figure 4D:
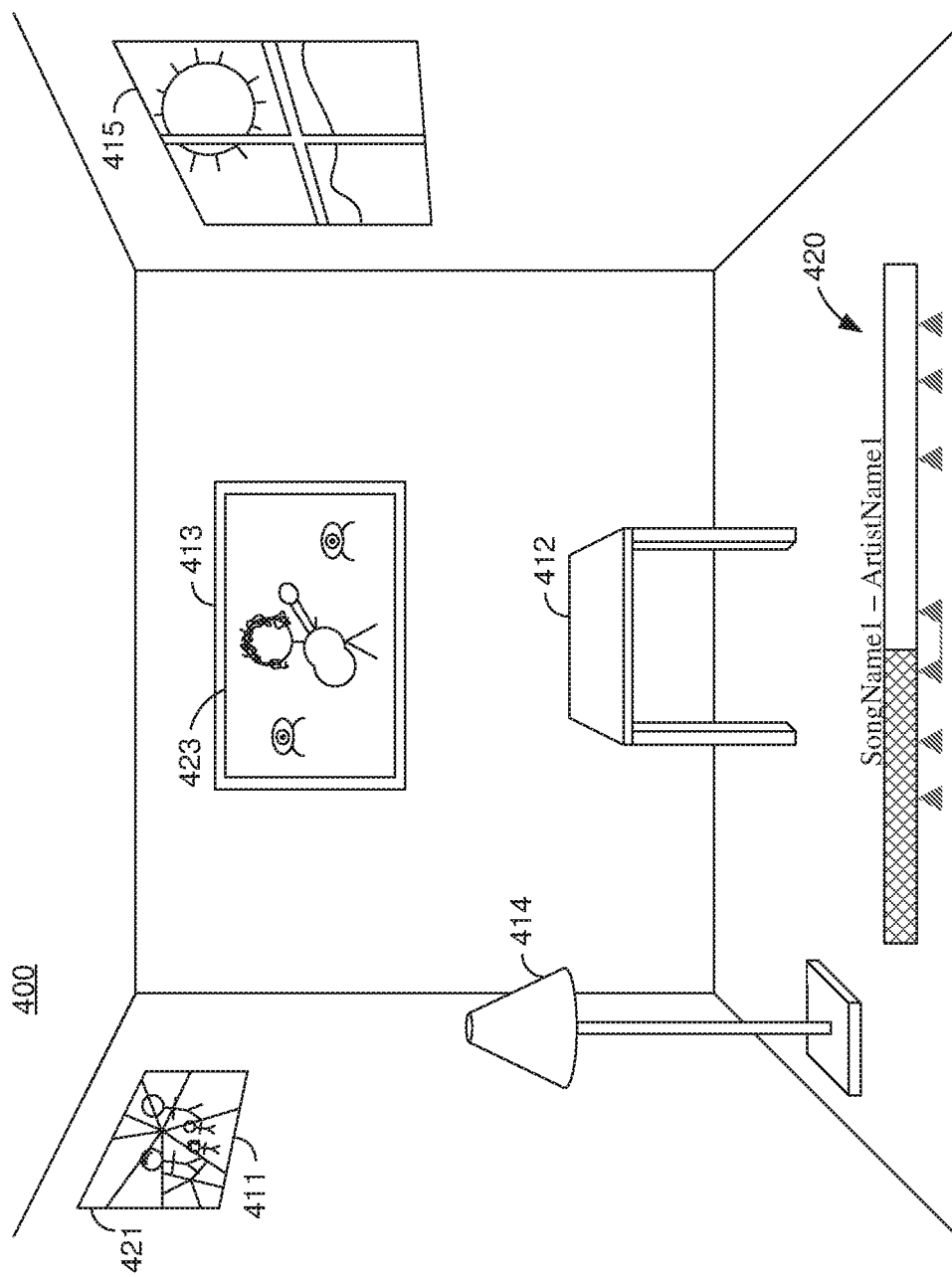

FIG. 4D illustrates the SR volumetric environment 400 of FIG. 4A at a fourth time during playback of the first audio file. In response to determining that a third temporal criterion of a third SR content event and a third environmental criterion of the third SR content event are met, the SR volumetric environment 400 includes the third SR content event. The third temporal criterion of the third SR content event is met when the current position in the timeline of the first audio file is within a trigger window (e.g. indicated by the third event indicium of the audio playback indicator 420). The third environmental criterion of the third SR content event is met when the SR volumetric environment 400 includes a dynamic square object of a particular reflectiveness. In FIG. 4D, the third environmental criterion is met because the SR volumetric environment 400 includes the television 413. In other implementations, the third environmental criterion is met because the SR volumetric environment includes a digital picture frame or computer monitor. Displaying the third SR content event includes displaying a virtual object (e.g., a video clip 423 of ArtistName1 playing a portion of the song) over the dynamic square object with the particular reflectiveness.

Figure 4E:
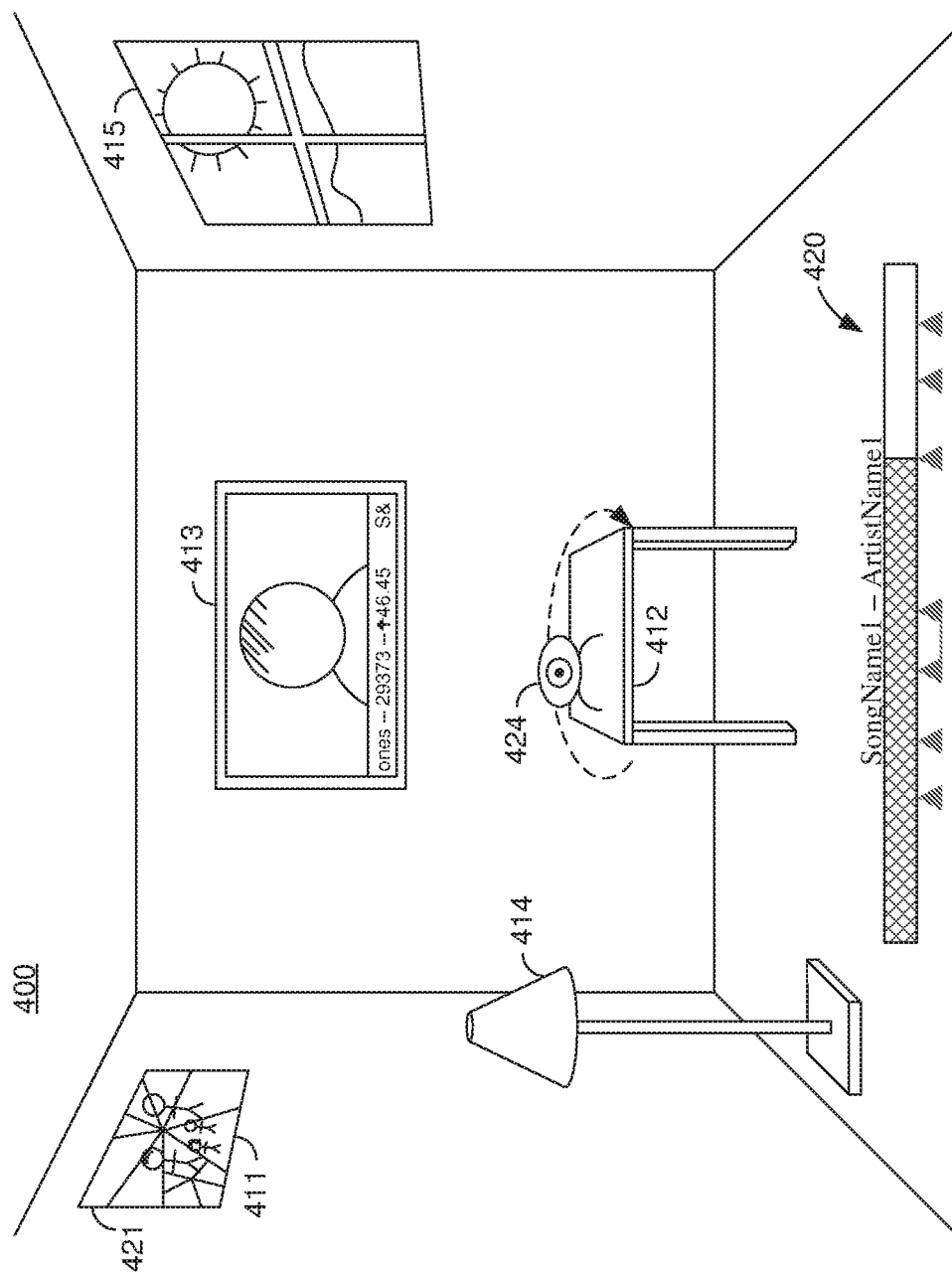

FIG. 4E illustrates the SR volumetric environment 400 of FIG. 4A at a fifth time during playback of the first audio file. In response to determining that a fourth temporal criterion of a fourth SR content event and a fourth environmental criterion of the fourth SR content event are met, the SR volumetric environment 400 includes the fourth SR content event. The fourth temporal criterion of the fourth SR content event is met when the current position in the timeline of the first audio file matches a trigger time (e.g. indicated by the fourth event indicium of the audio playback indicator 420). The fourth environmental criterion of the fourth SR content event is met when the SR volumetric environment 400 includes a table. In FIG. 4E, the fourth environmental criterion is met because the SR volumetric environment 400 includes the table 412. In other implementations, the fourth environmental criterion is met because the SR volumetric environment includes a different table or another object classified as a table. Displaying the fourth SR content event includes displaying a virtual object (e.g., another alien 424) moving across the table.

Figure 4F:
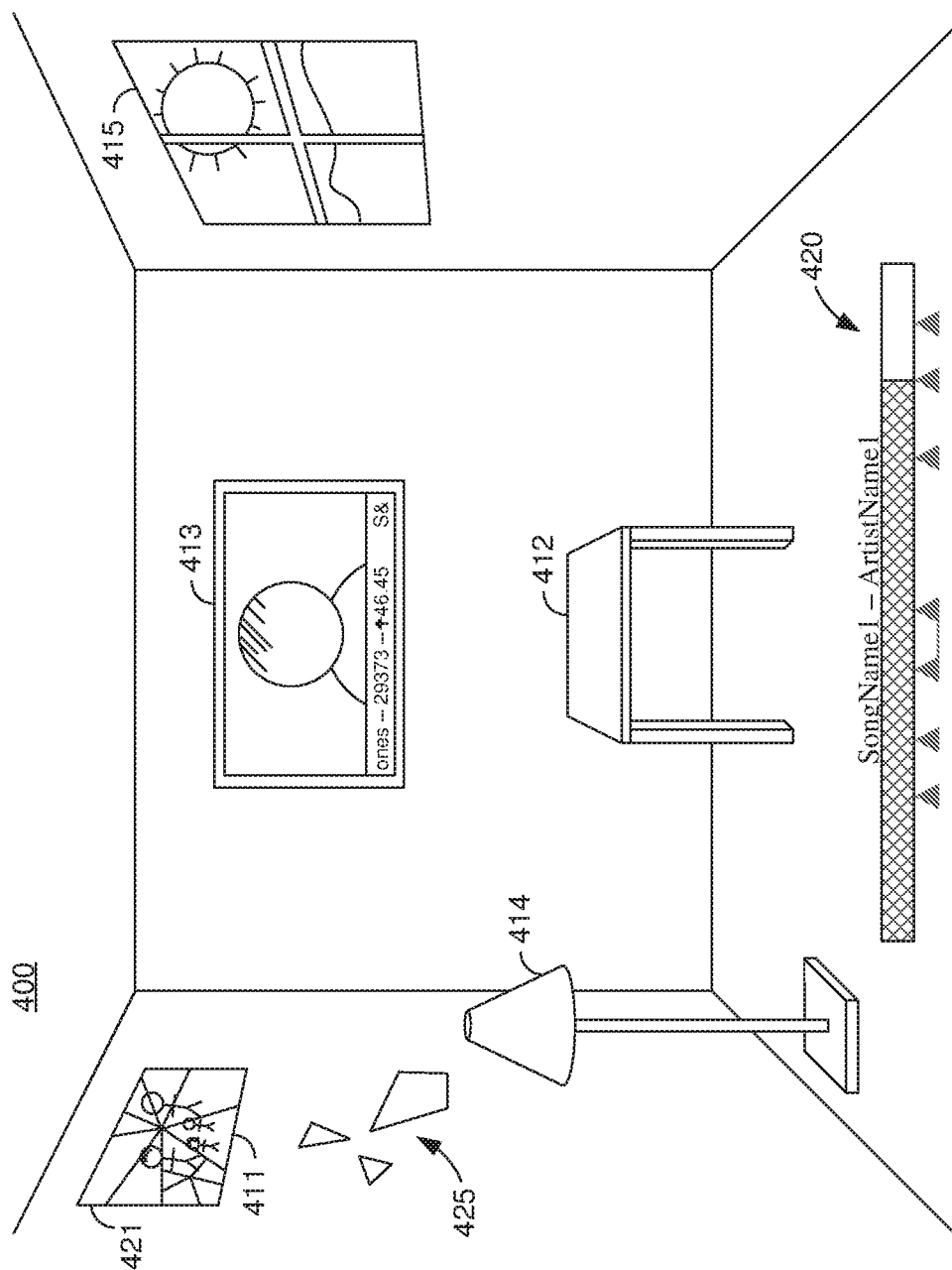

FIG. 4F illustrates the SR volumetric environment 400 of FIG. 4A at a sixth time during playback of the first audio file. In response to determining that a fifth temporal criterion of a fifth SR content event and a fifth environmental criterion of the fifth SR content event are met, and further in response to determining that another playback criterion of the fifth SR content event is met, the SR volumetric environment 400 includes the fifth SR content event. The fifth temporal criterion of the fifth SR content event is met when the current position in the timeline of the first audio file matches a trigger time (e.g. indicated by the fifth event indicium of the audio playback indicator 420). The fifth environmental criterion of the fifth SR content event is met (like the first environmental criterion of the first SR content event) when the SR volumetric environment 400 includes a square object with a particular reflectiveness. In FIG. 4F, the fifth environmental criterion is met because the SR volumetric environment 400 includes the photograph 411. In other implementations, the fifth environmental criterion is met because the SR volumetric environment includes a digital picture frame or a framed diploma. The other playback criterion of the fifth SR content event is met when the first SR content event was previously displayed. Accordingly, in various implementations, even though the fifth temporal criterion and the fifth environmental criterion are met, the fifth SR content event is not displayed because the first SR content event was not displayed (e.g., because the photograph 411 was not in the field of view of the scene camera at the corresponding trigger time). Displaying the fifth SR content event includes displaying a virtual object (e.g., broken glass 425) falling from the location of the square object with the particular reflectiveness.

Figure 4G:
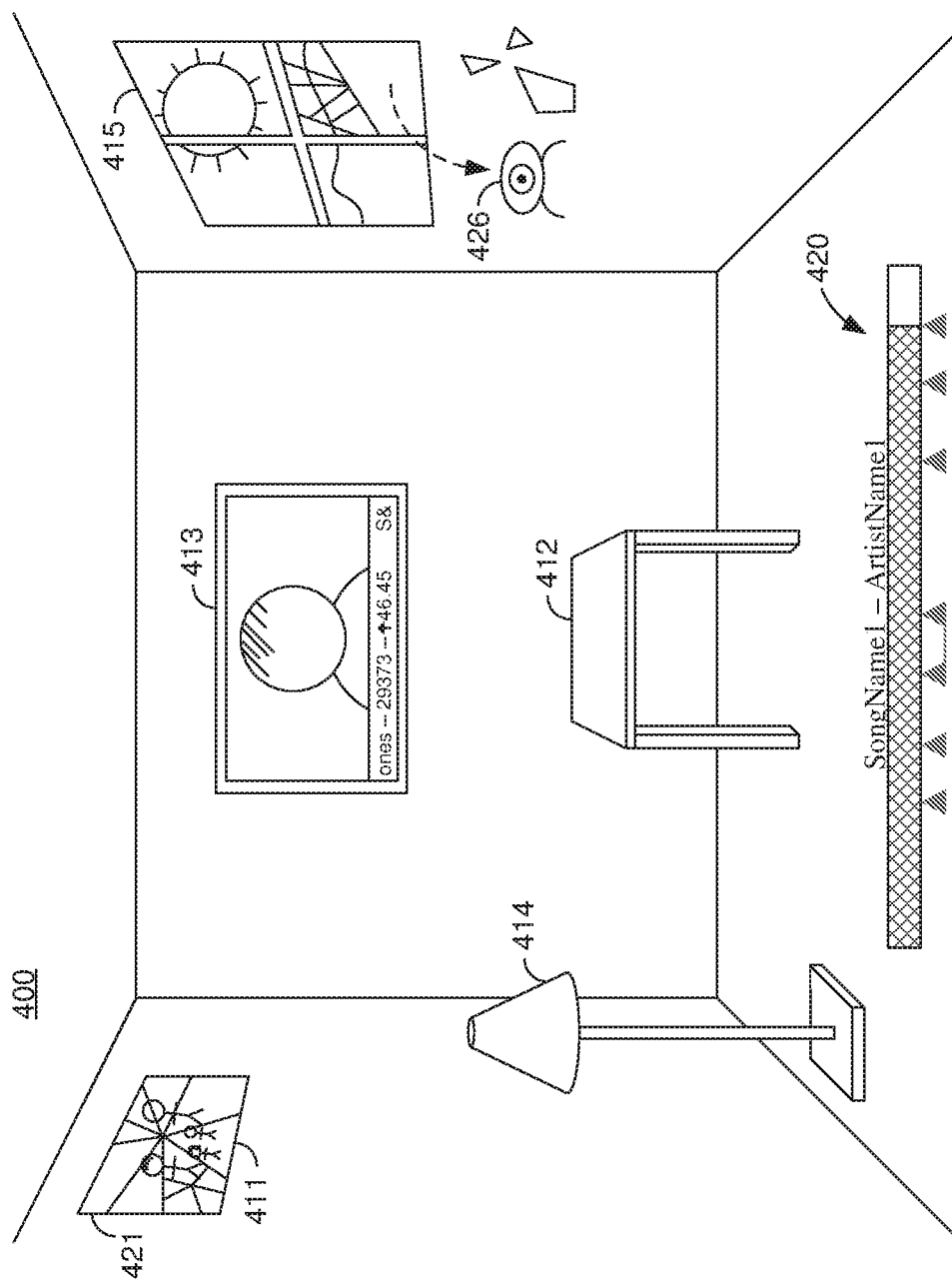

FIG. 4G illustrates the SR volumetric environment 400 of FIG. 4A at a seventh time during playback of the first audio file. In response to determining that a sixth temporal criterion of a sixth SR content event and a sixth environmental criterion of the sixth SR content event are met, the SR volumetric environment 400 includes the sixth SR content event. The sixth temporal criterion of the sixth SR content event is met when the current position in the timeline of the first audio file matches a trigger time (e.g. indicated by the sixth event indicium of the audio playback indicator 420). The sixth environmental criterion of the sixth SR content event is met when the SR volumetric environment 400 is classified as inside. In FIG. 4G, the sixth environmental criterion is met because the SR volumetric environment 400 is inside a room. Displaying the sixth SR content event includes displaying a virtual object (e.g., another alien 426) breaking into the room. Accordingly, in various implementations, an SR environment including a window (such as inside a car or outside a house), but classified as outside, would not trigger display of the sixth SR content event.

FIG. 5A illustrates a SR volumetric environment 500 based on a real environment (different than the real environment of FIGS. 4A-4G) surveyed by a scene camera of a device. In various implementations, the scene camera is part of a device that is worn by the user and includes a display that displays the SR volumetric environment 500. Thus, in various implementations, the user is physically present in the environment. In various implementations, the scene camera is part of remote device (such as a drone or robotic avatar) that transmits images from the scene camera to a local device that is worn by the user and includes a display that displays the SR volumetric environment 500.

FIG. 5A illustrates another SR volumetric environment 500 at a first time during playback of the first audio file (e.g., the song entitled "SongName1" by the artist named "ArtistName1").

The SR volumetric environment 500 includes a plurality of objects, including one or more real objects (e.g., a sky 511, a tree 512, a table 513, and sand 514) and one or more virtual objects (the audio playback indicator 420). In various implementations, each object is displayed at a location in the SR volumetric environment 400, e.g., at a location defined by three coordinates in a three-dimensional (3D) SR coordinate system. Accordingly, when the user moves in the SR volumetric environment 500 (e.g., changes either position and/or orientation), the objects are moved on the display of the HMD, but retain their location in the SR volumetric environment 500. In various implementations, certain virtual objects (such as the audio playback indicator 420) are displayed at locations on the display such that when the user moves in the SR volumetric environment 400, the objects are stationary on the display on the HMD.

FIG. 5B illustrates the SR volumetric environment 500 of FIG. 5A at a second time during playback of the first audio file. Because the SR volumetric environment 500 does not include a square object with a particular reflectiveness, the first SR content event (displayed in FIG. 4B) is not displayed. However, in response to determining that a seventh temporal criterion of a seventh SR content event and a seventh environmental criterion of the seventh SR content event are met, the SR volumetric environment 500 includes the seventh SR content event. The seventh temporal criterion of the seventh SR content event is met when the current position in the timeline of the first audio file matches a trigger time (e.g. indicated by the first event indicium of the audio playback indicator 420, e.g., the same trigger time of the first SR content event). The seventh environmental criterion of the seventh SR content event is met when the SR volumetric environment 500 includes the sky. In FIG. 5B, the fifth environmental criterion is met because the SR volumetric environment 500 includes the sky 511. Displaying the seventh SR content event includes displaying a virtual object (e.g., a spaceship 521) moving across the sky.

FIG. 5C illustrates the SR volumetric environment 500 of FIG. 5A at a third time during playback of the first audio file. Like FIG. 4C, in response to determining that the second temporal criterion and the second environmental criterion of the second SR content event are met, the SR volumetric environment 500 includes the second SR content event. As noted above, the second temporal criterion of the second SR content event is met when the current position in the timeline of the first audio file matches a trigger time (e.g. indicated by the second event indicium of the audio playback indicator 420) and the second environmental criterion of the second SR content event is met when the SR volumetric environment 500 includes an object of a particular shape having a long, skinny portion topped by a larger portion. In FIG. 5C, the second environmental criterion is met because the SR volumetric environment 500 includes the tree 512. As described above, displaying the second SR content event includes displaying a virtual object (e.g., an alien 422) dropping out from within or behind the larger portion and retreating into and hiding in or behind the larger portion.

FIG. 5D illustrates the SR volumetric environment 500 of FIG. 5A at a fourth time during playback of the first audio file. Because the SR volumetric environment 500 does not include a dynamic square object with a particular reflectiveness, the third SR content event (displayed in FIG. 4D) is not displayed. In the implementation of FIG. 5D, no SR content event is displayed at the fourth time.

FIG. 5E illustrates the SR volumetric environment 500 of FIG. 5A at a fifth time during playback of the first audio file. Like FIG. 4E, in response to determining that the fourth temporal criterion of the fourth SR content event and the fourth environmental criterion of the fourth SR content event are met, the SR volumetric environment 500 includes the fourth SR content event. As noted above, the fourth temporal criterion of the fourth SR content event is met when the current position in the timeline of the first audio file matches a trigger time (e.g. indicated by the fourth event indicium of the audio playback indicator 420) and the fourth environmental criterion of the fourth SR content event is met when the SR volumetric environment 400 includes a table. In FIG. 5E, the fourth environmental criterion is met because the SR volumetric environment 500 includes the table 513. As noted above, displaying the fourth SR content event includes displaying a virtual object (e.g., another alien 424) moving across the table.

FIG. 5F illustrates the SR volumetric environment 500 of FIG. 5A at a sixth time during playback of the first audio file. In response to determining that an eighth temporal criterion of a eighth SR content event and a eighth environmental criterion of the eighth SR content event are met, and further in response to determining that another playback criterion of the eighth SR content event is met, the SR volumetric environment 500 includes the eighth SR content event. The eighth temporal criterion of the eighth SR content event is met when the current position in the timeline of the first audio file matches a trigger time (e.g. indicated by the fifth event indicium of the audio playback indicator 420). The eighth environmental criterion of the eighth SR content event is met (like the seventh environmental criterion of the seventh SR content event) when the SR volumetric environment 500 includes the sky. In FIG. 5F, the eighth environmental criterion is met because the SR volumetric environment 500 includes the sky 511. The other playback criterion of the eighth SR content event is met when the seventh SR content event was previously displayed. Accordingly, in various implementations, even though the eighth temporal criterion and the eighth environmental criterion are met, the eighth SR content event is not displayed because the seventh SR content event was not displayed (e.g., because the sky 511 was not in the field of view of the scene camera at the corresponding trigger time, such as when the user was inside, but has moved outside). Displaying the eighth SR content event includes displaying a virtual object (e.g., the spaceship 521 of the seventh SR content event) moving across the sky with another virtual object (e.g., a fighter plane 525).

FIG. 5G illustrates the SR volumetric environment 500 of FIG. 5A at a seventh time during playback of the first audio file. Because the SR volumetric environment 500 is not classified as inside, the sixth SR content event (displayed in FIG. 4G) is not displayed. However, in response to determining that a ninth temporal criterion of a ninth SR content event and a ninth environmental criterion of the ninth SR content event are met, the SR volumetric environment 500 includes the ninth SR content event. The ninth temporal criterion of the ninth SR content event is met when the current position in the timeline of the first audio file matches a trigger time (e.g. indicated by the sixth event indicium of the audio playback indicator 420). The ninth environmental criterion of the fifth SR content event is met when the SR volumetric environment 500 is classified as outside. In FIG. 5G, the ninth environmental criterion is met because the SR volumetric environment 500 is outside at the beach. Displaying the ninth SR content event includes displaying a plurality of virtual objects (e.g., multiple aliens 526A-526B) burrowing out of the ground.

Figure 6:
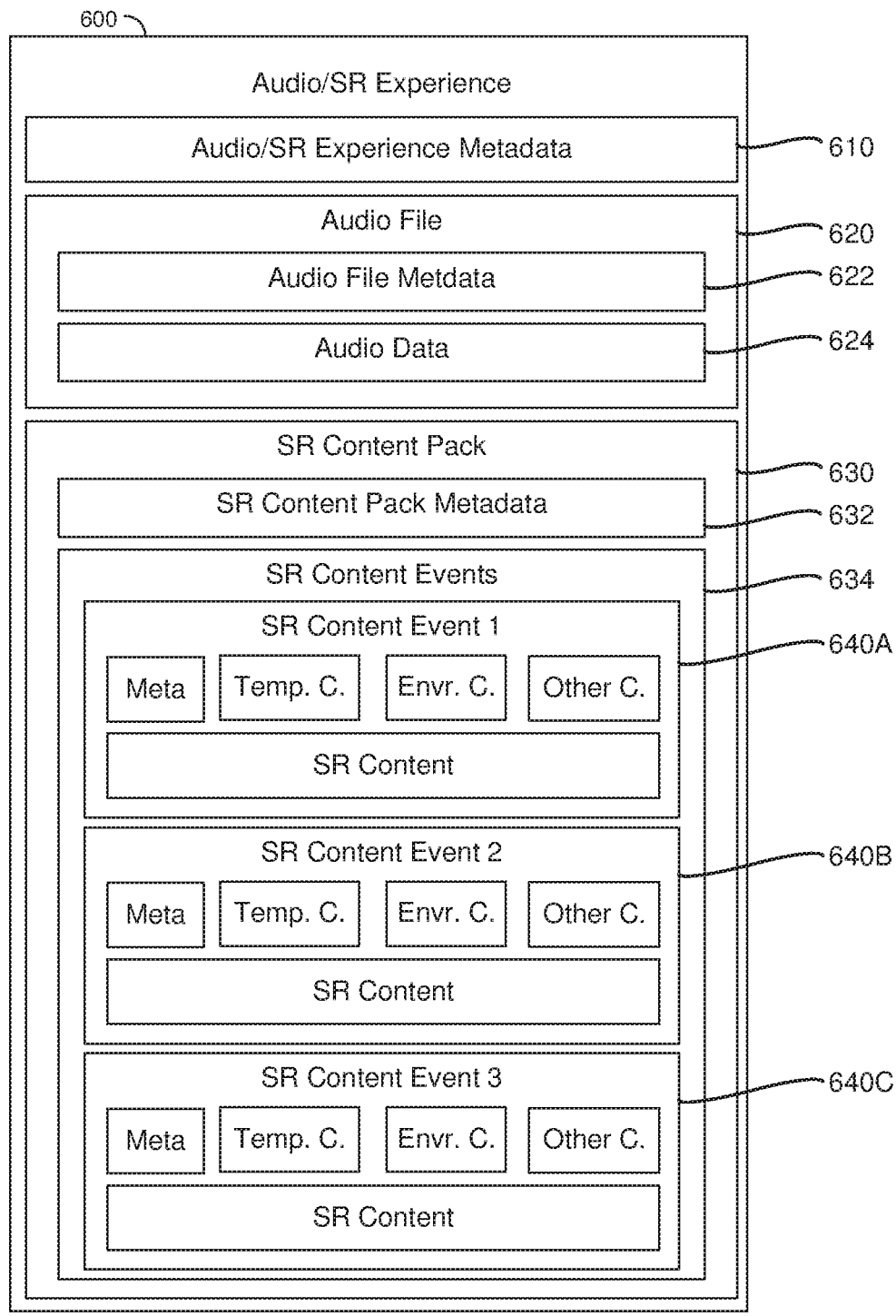
FIG. 6 illustrates an audio/SR experience data object in accordance with some implementations.

FIG. 6 illustrates an audio/SR experience data object 600 in accordance with some implementations. The audio/SR experience data object 600 includes audio/SR experience metadata 610. In various implementations, the audio/SR experience metadata 610 includes a title of the audio/SR experience data object 600. In various implementations, the audio/SR experience metadata 610 includes data indicative of a creator or provider of the audio/SR experience. In various implementations, the audio/SR experience metadata 610 includes data indicative of when the audio/SR experience was created (e.g., a date or year).

The audio/SR experience data object 600 includes an audio file 620. In various implementations, the audio file is, for example, an MP3 file, an AAC file, or a WAV file. The audio file 620 includes audio file metadata 622. In various implementations, the audio file metadata 622 includes data indicative of a title, an artist, an album, a year-of-release, lyrics, etc. The audio file 620 includes audio data 624. In various implementations, the audio data 624 includes data indicative of audio playable by a speaker. In various implementations, the audio data 624 includes data indicative of a song or spoken words.

The audio/SR experience data object 600 includes an SR content pack 630. In various implementations, the SR content pack 630 includes SR content pack metadata 632 and a plurality of SR content events 634. The plurality of SR content events 634 include a first SR content event 640A, a second SR content event 640B, and a third SR content event 640C. In various implementations, the SR content pack 630 can include any number of SR content events 640A-640C.

The first SR content event 640A includes metadata (such as an event identifier, or a name of the SR content event).

The first SR content event 640A includes data indicative of a temporal criterion. In various implementations, the temporal criterion is met when a current position in the timeline of the audio file matches a trigger time of the SR content event. In various implementations, the temporal criterion is met when a current position in the timeline of the audio file is within a trigger time range of the SR content event.

The first SR content event 640A includes data indicative of an environmental criterion. In various implementations, the environmental criterion is met when the environment of a scene camera surveying the environment is a particular environment class. For example, in various implementations, the environment is classified as a big room, a small room, inside, outside, light, or dark. Accordingly, in various implementations, the environmental criterion includes data indicative of an environment class. In various implementations, the environmental criterion is met when the environment of a scene camera surveying the environment includes an object of a particular shape. For example, in various implementations, the particular shape is a generally round object within a size range or an object taller than a first threshold, but narrower than a second threshold. Accordingly, in various implementations, the environmental criterion includes a definition of a shape or class of shapes, such as shape-matching criteria. In various implementations, the environmental criterion is met when the environment of a scene camera surveying the environment includes an object of a particular type. For example, in various implementations, the particular type may a window, a table, a mirror, a display screen, etc. Accordingly, in various implementations, the environmental criterion includes data indicative of an object type.

The first SR content event 640A includes data indicative of other criteria. In various implementations, the other criteria related to one or more of user settings, other SR content events having previously played, a user trigger/action, time of day, user biometrics, ambient sounds, a random number, etc.

The first SR content event 640A includes SR content that is displayed when the temporal criterion and environmental criterions (and any other criteria) are met. In various implementations, the SR content is displayed over representations of real objects in the environment. In various implementations, the SR content includes a supplemental audio file that is played concurrently with the audio file.

The second SR content event 640B and third SR content event 640C include substantially similar fields as the first SR content event 640A. In various implementations, the plurality of SR content events 634 include two events with the same temporal criterion, but different environmental criteria. In various implementations, the plurality of SR content events 634 include two events with the same environmental criterion, but different temporal criteria.

In various implementations, the audio/SR experience data object 600 is stored as a file. In various implementations, the audio/SR experience data object 600 is created, e.g., designed, engineered, and/or programmed, by a human designer using, e.g., a programming interface of a computing device.

In various implementations, multiple audio/SR experience data objects are stored in a non-transitory memory. In various implementations, a plurality of audio/SR experience data objects are stored by a content provider. Further, the content provider can provide a virtual storefront for selling audio/SR experience data objects to consumers. Accordingly, in various implementations, one or more of a plurality of audio/SR experience data objects are transmitting and/or downloaded (e.g., streamed or saved by a consumer on a different non-transitory memory).

In various implementations, the SR content packs are stored, sold, transmitted, downloaded, and/or streamed separately from the audio files. Accordingly, in various implementations, the SR content pack metadata includes an indication of the audio file with which it is associated.

Figure 7:
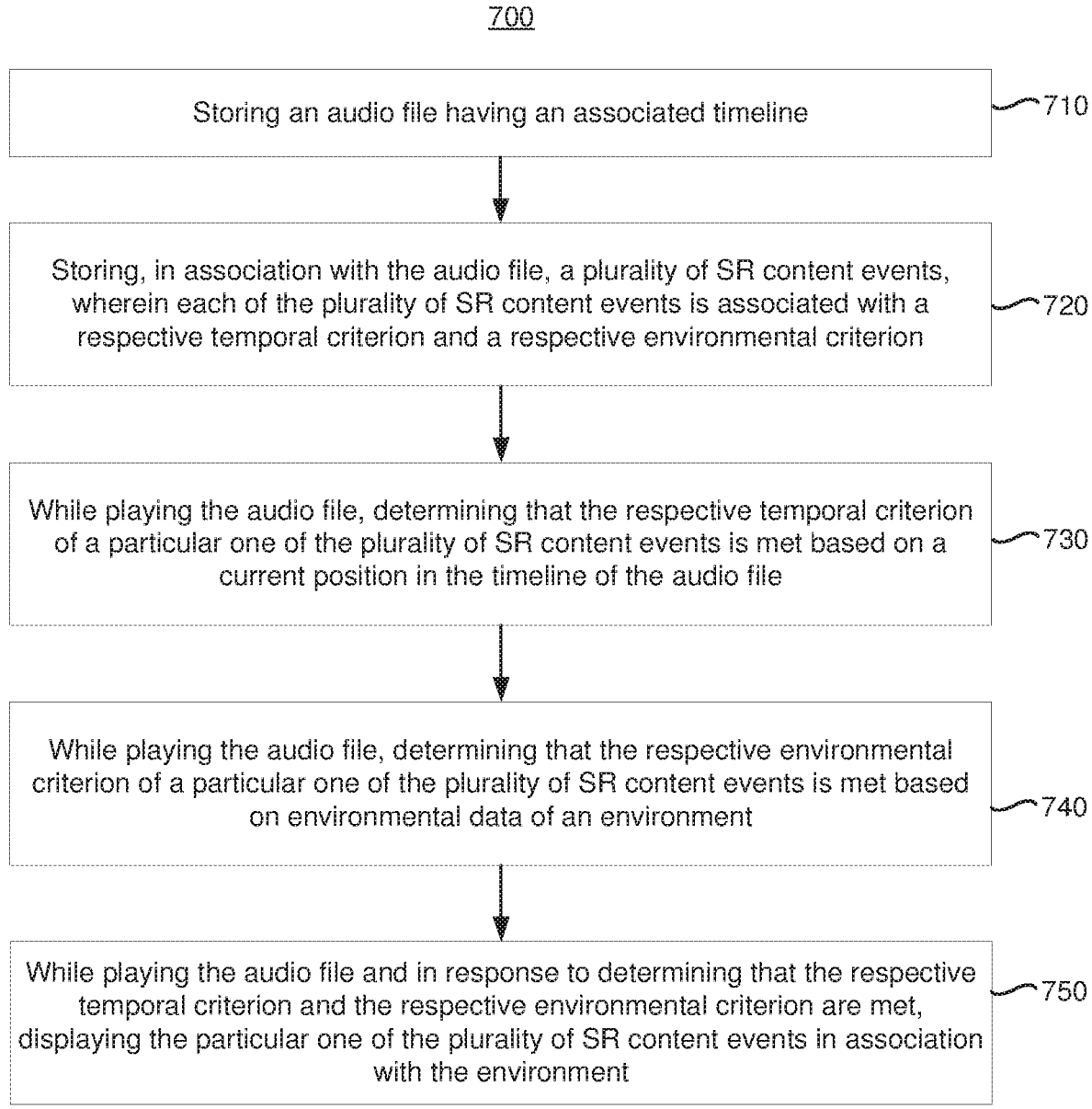
FIG. 7 is a flowchart representation of a first method of presenting an audio/SR experience in accordance with some implementations.

FIG. 7 is a flowchart representation of a first method 700 of presenting an audio/SR experience in accordance with some implementations. In various implementations, the method 700 is performed by a device with one or more processors, non-transitory memory, a speaker, and a display (e.g., the HMD 120B of FIG. 3). In some implementations, the method 700 is performed by processing logic, including hardware, firmware, software, or a combination thereof. In some implementations, the method 700 is performed by a processor executing instructions (e.g., code) stored in a non-transitory computer-readable medium (e.g., a memory).

The method 700 begins, in block 710, with the device storing an audio file having an associated timeline. In various implementations, the audio file is an MP3 file, an AAC file, a WAV file, etc. In various implementations, the audio file includes audio data representing music and/or spoken words (e.g., an audiobook).

The method 700 continues, in block 720, with the device storing, in association with the audio file, a plurality of SR content events. Each of the plurality of SR content events is associated with a respective temporal criterion and a respective environmental criterion. In various implementations, the plurality of SR content events are stored in association with the audio file as a single data object, such as the audio/SR experience data object 600 of FIG. 6. In various implementations, the plurality of SR content events are stored in association with the audio file separately from audio file, but with metadata indicating the audio file with which the plurality of SR content events is associated.

The method 700 continues, in block 730, with the device, while playing the audio file, determining that the respective temporal criterion of a particular one of the plurality of SR content events is met based on a current position in the timeline of the audio file. In various implementations, the respective temporal criterion is met when the current position in the timeline of the audio file matches a trigger time of the particular one of the plurality of SR content events. For example, in FIG. 4B, the first temporal criterion of the first SR content event is met when the current position in the timeline of the first audio file matches a trigger time (e.g. indicated by the first event indicium of the audio playback indicator 420). In various implementations, the respective temporal criterion of the particular one of the plurality of SR content events is met when the current position in the timeline of the audio file is within a trigger time range of the particular one of the plurality of SR content events. For example, in FIG. 4D, the third temporal criterion of the third SR content event is met when the current position in the timeline of the first audio file is within a trigger window (e.g. indicated by the third event indicium of the audio playback indicator 420). In various implementations, the SR content event has an SR content timeline coextensive with the time window and corresponding portions of the particular one of the plurality of SR content events are displayed (as described below with respect to block 750) at times when the respective environmental criterion is met. For example, in various implementations, the particular one of the plurality of SR content events includes a video clip and, whenever the field of view of the scene camera includes a television during the time window, the corresponding portion of the video clip is displayed on the television.

The method 700 continues, in block 740, with the device, while playing the audio file, determining that the respective environmental criterion of a particular one of the plurality of SR content events is met based on environmental data of an environment (e.g., an environment surveyed by a scene camera of the device). In various implementations, the scene camera is part of a device that is worn by the user and includes a display that displays the particular one of the plurality of SR content events (as described below with respect to block 750). Thus, in various implementations, the user is physically present in the environment. In various implementations, the scene camera is part of remote device (such as a drone or robotic avatar) that transmits images from the scene camera to a local device that is worn by the user and includes a display that displays the particular one of the plurality of SR content events.

In various implementations, the respective environmental criterion of the particular one of the plurality of SR content events is met when the environment is a particular environment class. In various implementations, the device classifies the environment as inside, outside, a big room, a small room, light, dark, etc. For example, in FIG. 4G, the sixth environmental criterion of the sixth SR content event is met because the SR volumetric environment 400 is inside a room and, thus, is classified as an environmental class of "inside." As another example, in FIG. 5G, because the SR volumetric environment 500 is not classified as an environment class of "inside," the sixth environmental criterion is not met, but the ninth environmental criterion of the ninth SR content event is met because the SR volumetric environment 500 is outside at the beach and, thus, is classified as an environmental class of "outside."

In various implementations, the device determines that the respective environmental criterion of the particular one of the plurality of SR content events is met by performing image analysis of an image of the environment (e.g., as captured by a scene camera of the device). Accordingly, in various implementations, the environmental data of the environment includes an image of the environment. In various implementations, performing image analysis of the image of the environment includes performing object detection and/or classification.

In various implementations, the respective environmental criterion of the particular one of the plurality of SR content events is met when the image of the environment includes an object of a particular shape. For example, in FIG. 4C, the second environmental criterion of the second SR content event is met because the SR volumetric environment 400 includes an object of a particular shape having a long, skinny portion topped by a larger portion, e.g., the lamp 414. As another example, in FIG. 5C, the second environmental criterion is also met because the SR volumetric environment 500 also includes an object of the particular shape having a long, skinny portion topped by a larger portion, e.g., the tree 512.

In various implementations, the particular shape is a generally round object within a size range. Thus, in various implementations, displaying the particular one of the plurality of SR content events (as described below with respect to block 750) includes displaying a disco ball over the generally round object. In various implementations, the particular shape is a flat surface of at least a threshold size. Thus, in various implementations, displaying the particular one of the SR content events (as described below with respect to block 750) includes displaying video content on the flat surface.

In various implementations, the respective environmental criterion of the particular one of the plurality of SR content events is met when the image of the environment includes an object of a particular type. For example, in FIG. 4E, the fourth environmental criterion of the fourth SR content event is met because the SR volumetric environment 400 includes an object classified as a "table," in particular, the table 412. As another example, in FIG. 5E, the fourth environmental criterion is also met because the SR volumetric environment 500 also includes an object classified as a "table," in particular, the table 513.

In various implementations, the particular type is a "mirror." Thus, in various implementations, displaying the particular one of the plurality of SR content events (as described below with respect to block 750) includes displaying SR content over the mirror, such as virtual objects that exist only in the "mirror world." In various implementations, the particular type is a "window." Thus, in various implementations, displaying the particular one of the plurality of SR content events (as described below with respect to block 750) includes displaying SR content over the window, such as virtual objects that appear to be outside, beyond the window. In various implementations, the particular type is a "display screen." Thus, in various implementations, displaying the particular one of the plurality of SR content events (as described below with respect to block 750) includes displaying SR content on the display screen, such as a video clip of the artist on a television. In various implementations, the particular type is a "photograph." Thus, in various implementations, displaying the particular one of the plurality of SR content events (as described below with respect to block 750) includes displaying SR content over the photograph, such as replacing a family photograph with a photograph of the artist or replacing a cat poster with a poster of a concert promotion featuring the artist.

As noted above, in various implementations, the environmental data includes an image of the environment. In various implementations, the environmental data includes a GPS location of the device. Accordingly, in various implementations, the respective environmental criterion is met when the GPS location indicates that the device is at a particular location. In various implementations, the environmental data includes network connectivity information. Accordingly, in various implementations, the respective environmental criterion is met when the device is connected to a user's home WiFi. In various implementations, the respective environmental criterion is met when the device is connected to a public WiFi network.

In various implementations, the environmental data includes a sound recording of the environment. Accordingly, in various implementations, the respective environmental criterion is met when a particular sound is detected or when the environment is quiet.

The method 700 continues, in block 750, with the device, while playing the audio file and in response to determining that the respective temporal criterion and the respective environmental criterion are met, displaying the particular one of the plurality of SR content events in association with the environment. In various implementations, displaying the particular one of the plurality of SR content events includes displaying content over an object detected in the environment. In various implementations, displaying the particular one of the plurality of SR content events includes displaying content over a detected object. Accordingly, in various implementations, displaying the particular one of the plurality of SR content events includes replacing a real object in an SR volumetric environment with a virtual object in the SR volumetric environment. In various implementations, displaying the particular one of the plurality of SR content events includes displaying content proximate to or attached to a detected object. Accordingly, in various implementations, displaying the particular one of the plurality of SR content events includes displaying a virtual object attached to a real object in the SR volumetric environment.

Figure 8A:
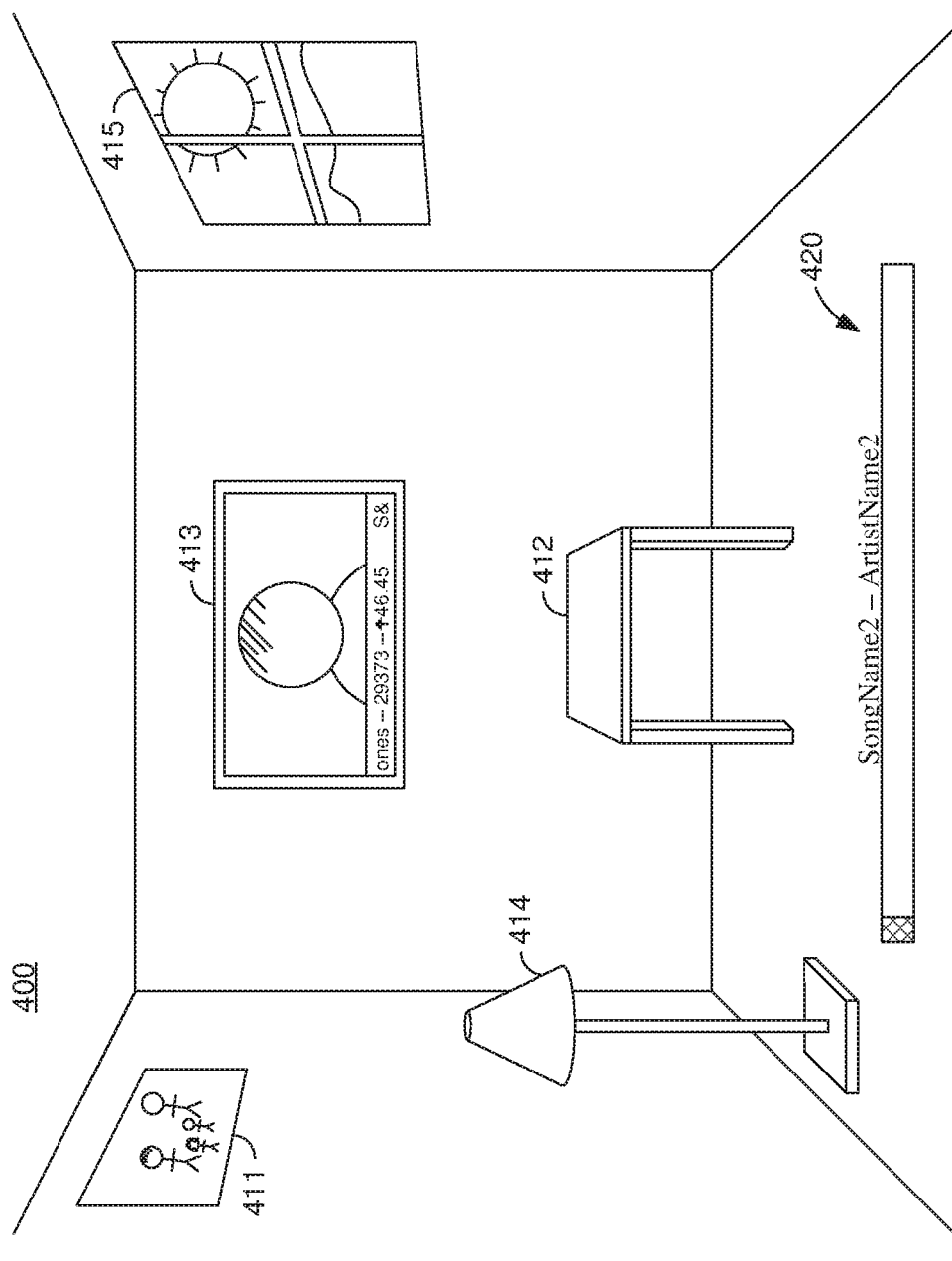
FIGS. 8A-8B illustrate the SR volumetric environment of FIG. 4A during playback of a second audio file in accordance with some implementations.

FIG. 8A illustrates the SR volumetric environment 400 of FIG. 4A at a first time during playback of a second audio file (e.g., a song entitled "SongName2" by an artist named "ArtistName2").

Figure 8B:
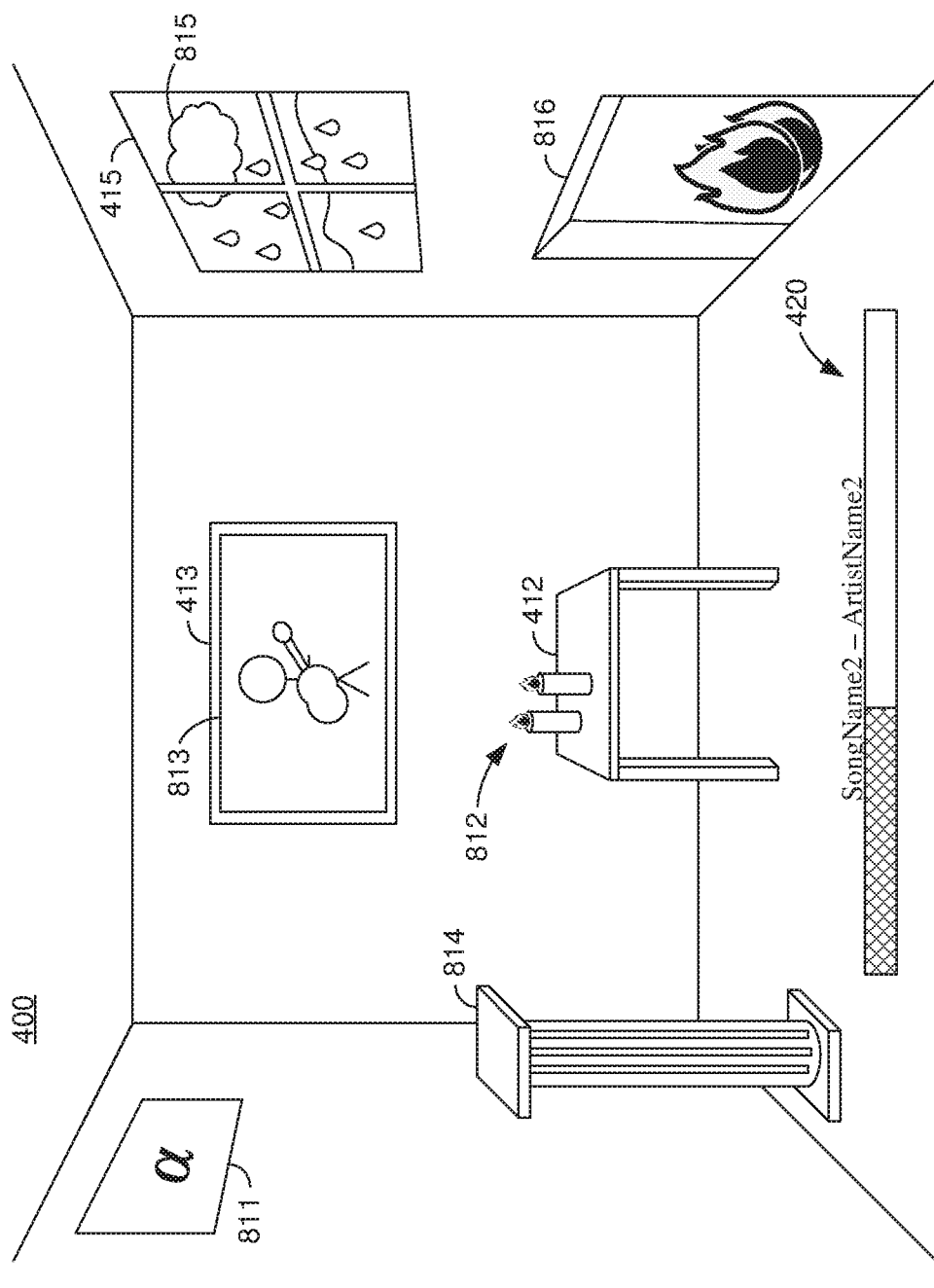

FIG. 8B illustrates the SR volumetric environment 400 of FIG. 4A at a second time during playback of the second audio file. In FIG. 8B, SR content (based on the audio file and the real environment) is displayed in the SR volumetric environment 400.

In FIG. 8B, the photograph 411 is replaced with an album cover 811 associated with an album of the second audio file. The television 413 is altered from displaying a news program to displaying a concert clip 813 of the artist playing the song of the second audio file. The window 415 is altered such that rain 815 appears outside (e.g., based on the title of the second audio file including the word "rain"). The lamp 414 is replaced with Greek column 814 (e.g., based on the genre of the second audio file being "Greek"). A fireplace 816 is displayed on a wall of the SR volumetric environment 400 (e.g., based on lyrics of the second audio file including the phrase "sitting by the fire"). Candles 812 are displayed upon the table 412 (e.g., in response to lyrical/musical analysis of the second audio file indicating that it is classified as a love song).

Figure 9A:
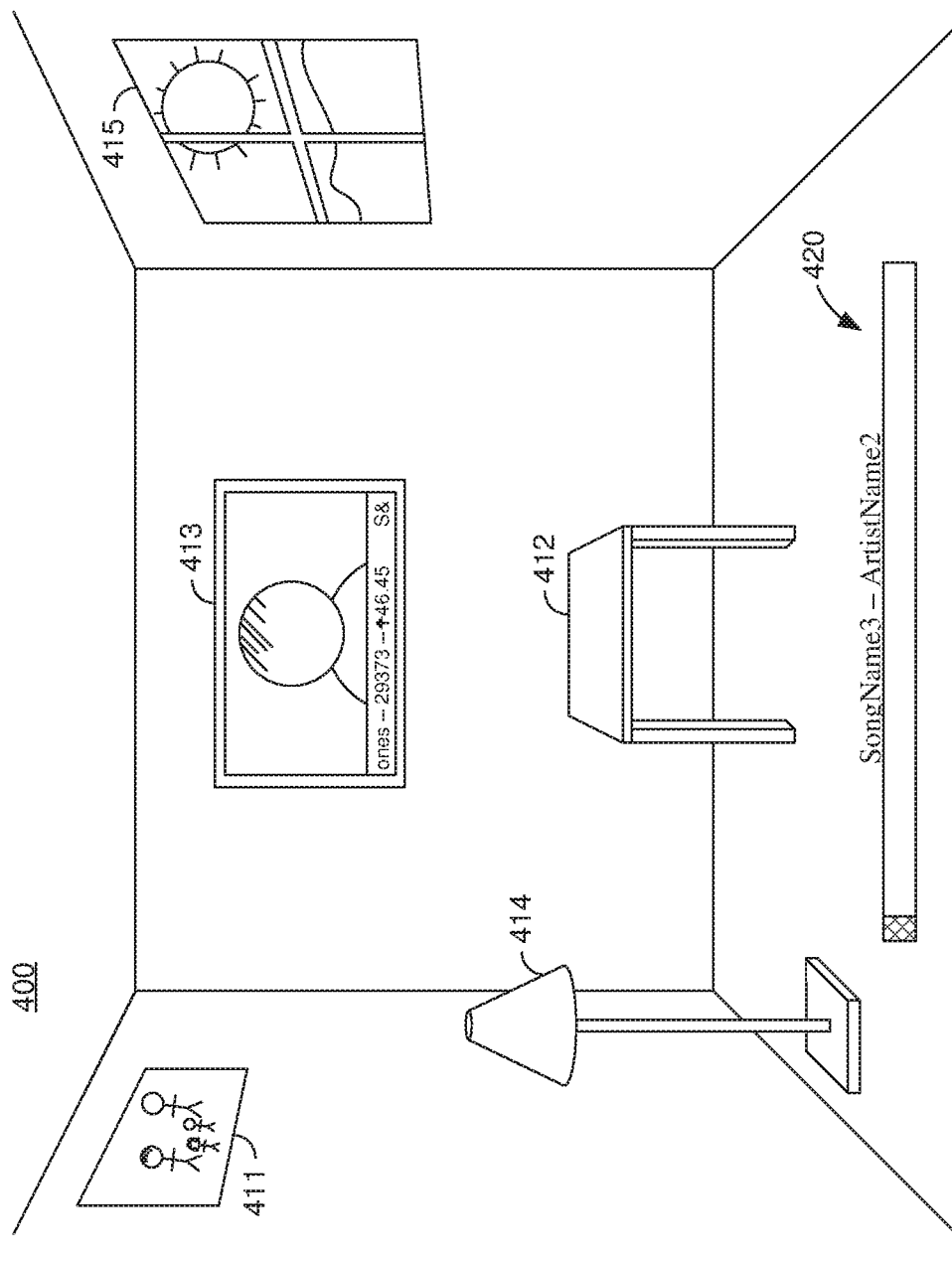
FIGS. 9A-9C illustrate the SR volumetric environment of FIG. 4A during playback of a third audio file in accordance with some implementations.

FIG. 9A illustrates the SR volumetric environment 400 of FIG. 4A at a first time during playback of a third audio file (e.g., a song entitled "SongName3" by an artist named "ArtistName2").

Figure 9B:
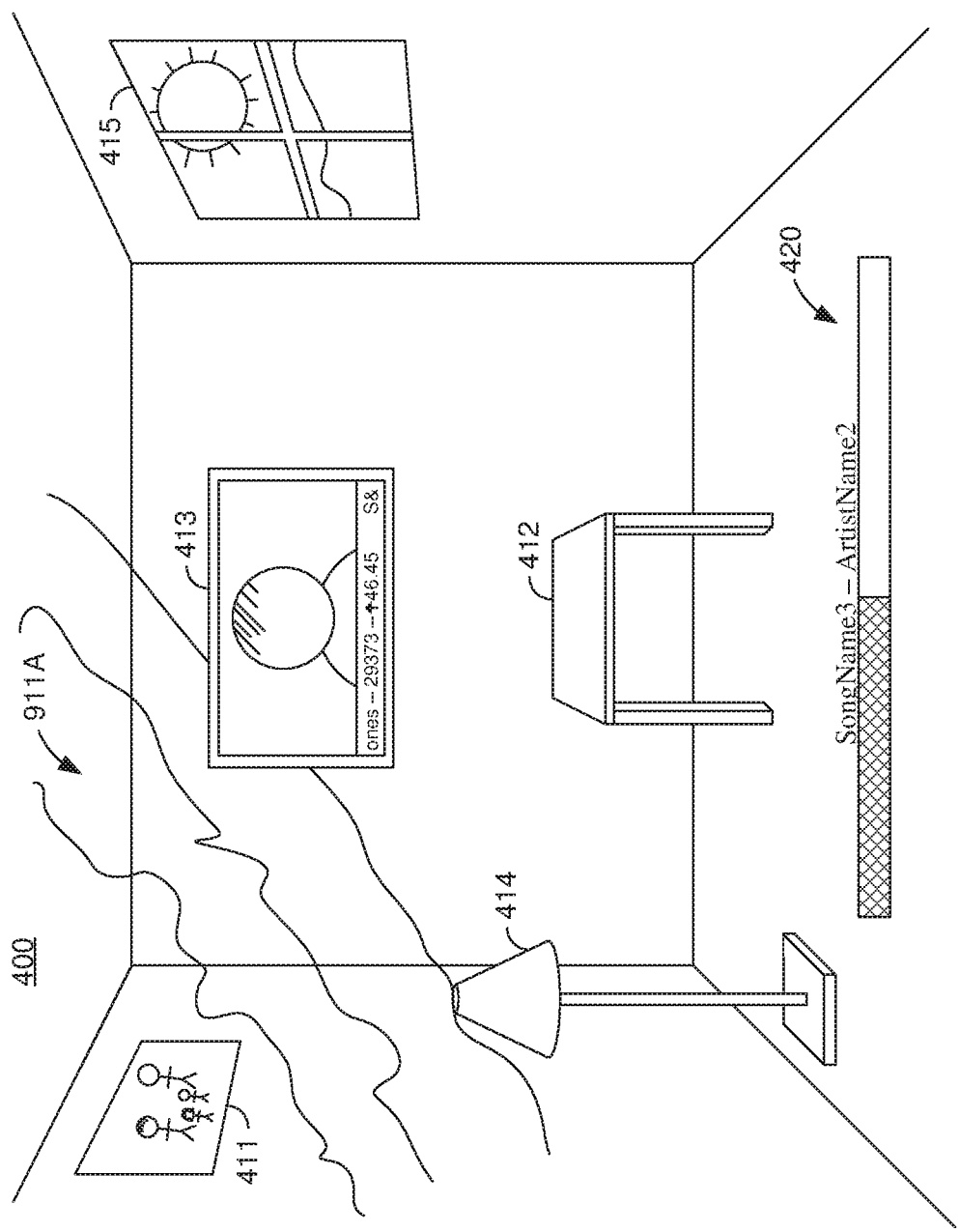

FIG. 9B illustrates the SR volumetric environment 400 of FIG. 4A at a second time during playback of the third audio file. In FIG. 9B, SR content (based on the audio file and the real environment) is displayed in the SR volumetric environment 400.

In FIG. 9B, a first set of audio/SR lines 911A are displayed on the room boundaries (e.g., ceiling, floor, and walls) of the SR volumetric environment 400. The audio/SR lines 911A are based on the audio data of the third audio file. For example, in various implementations, the audio/SR lines 911A are based on volume and/or frequency of the audio data of the third audio file at the second time. Accordingly, the audio/SR lines 911A are generated using an audio visualizer algorithm. The audio/SR lines 911A are based on the real environment in that they are displayed only on the room boundaries of the SR volumetric environment 400. Accordingly, the audio/SR lines 911A are occluded by the television 413. Similarly, the audio/SR lines 911A are distorted by the locations of the room boundaries, e.g., bent at corners of the room of the SR volumetric environment 400.

Figure 9C:
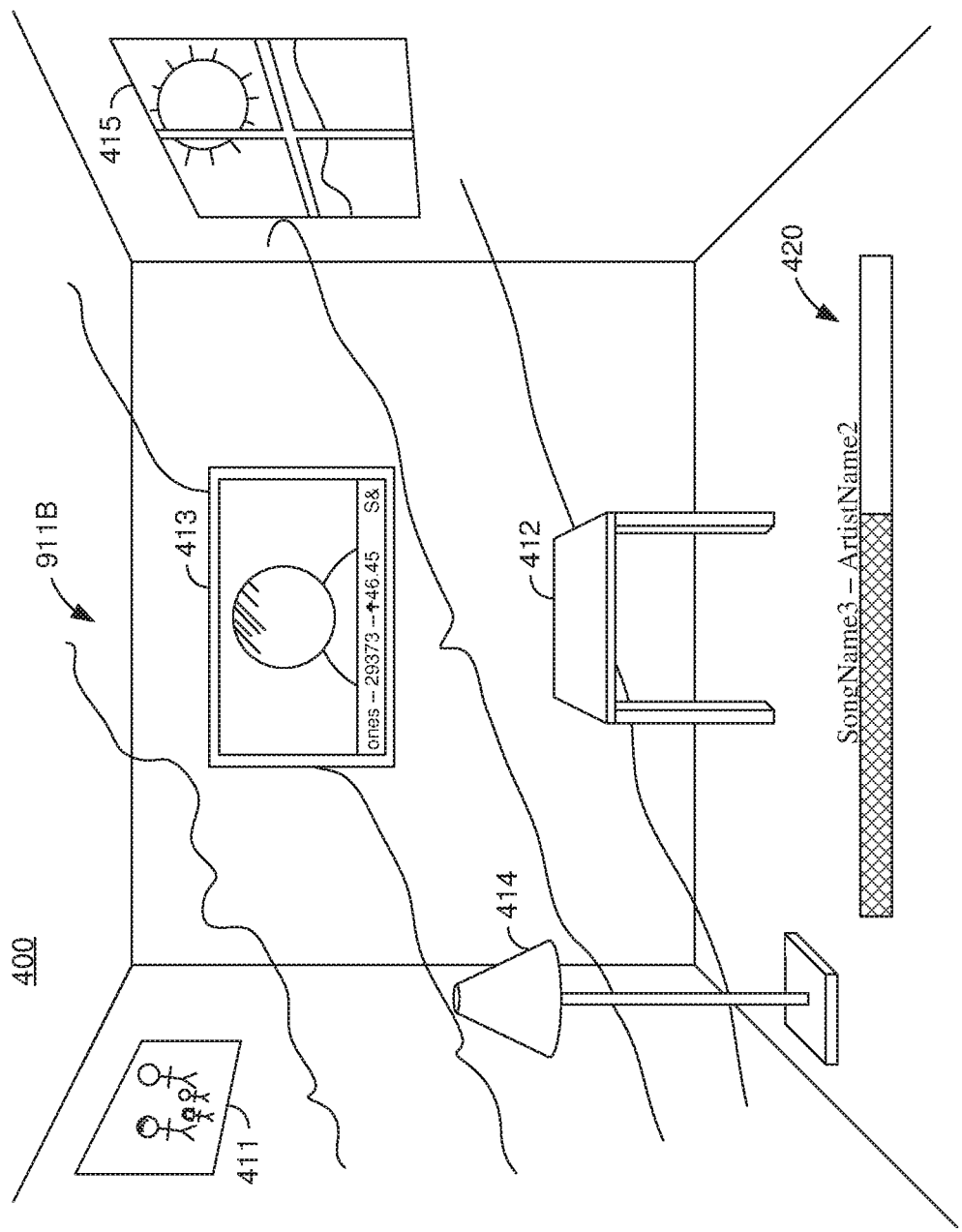

FIG. 9C illustrates the SR volumetric environment 400 of FIG. 4A at a third time during playback of the third audio file. In FIG. 9C, SR content (based on the audio file and the real environment) is displayed in the SR volumetric environment 400.

In FIG. 9C, a second set of audio/SR lines 911B are displayed on the room boundaries (e.g., ceiling, floor, and walls) of the SR volumetric environment 400. The audio/SR lines 911B are based on the audio data of the third audio file at the third time. For example, in various implementations, the audio/SR lines 911B are based on volume and/or frequency of the audio data of the third audio file at the third time. Accordingly, the audio/SR lines 911B are generated using an audio visualizer algorithm. The audio/SR lines 911B are based on the real environment in that they are displayed only on the room boundaries of the SR volumetric environment 400. Accordingly, the audio/SR lines 911B are occluded by the television 413, the table 412, and the lamp 414. Similarly, the audio/SR lines 911B are distorted by the locations of the room boundaries, e.g., bent at corners of the room of the SR volumetric environment 400.

Figure 10A:
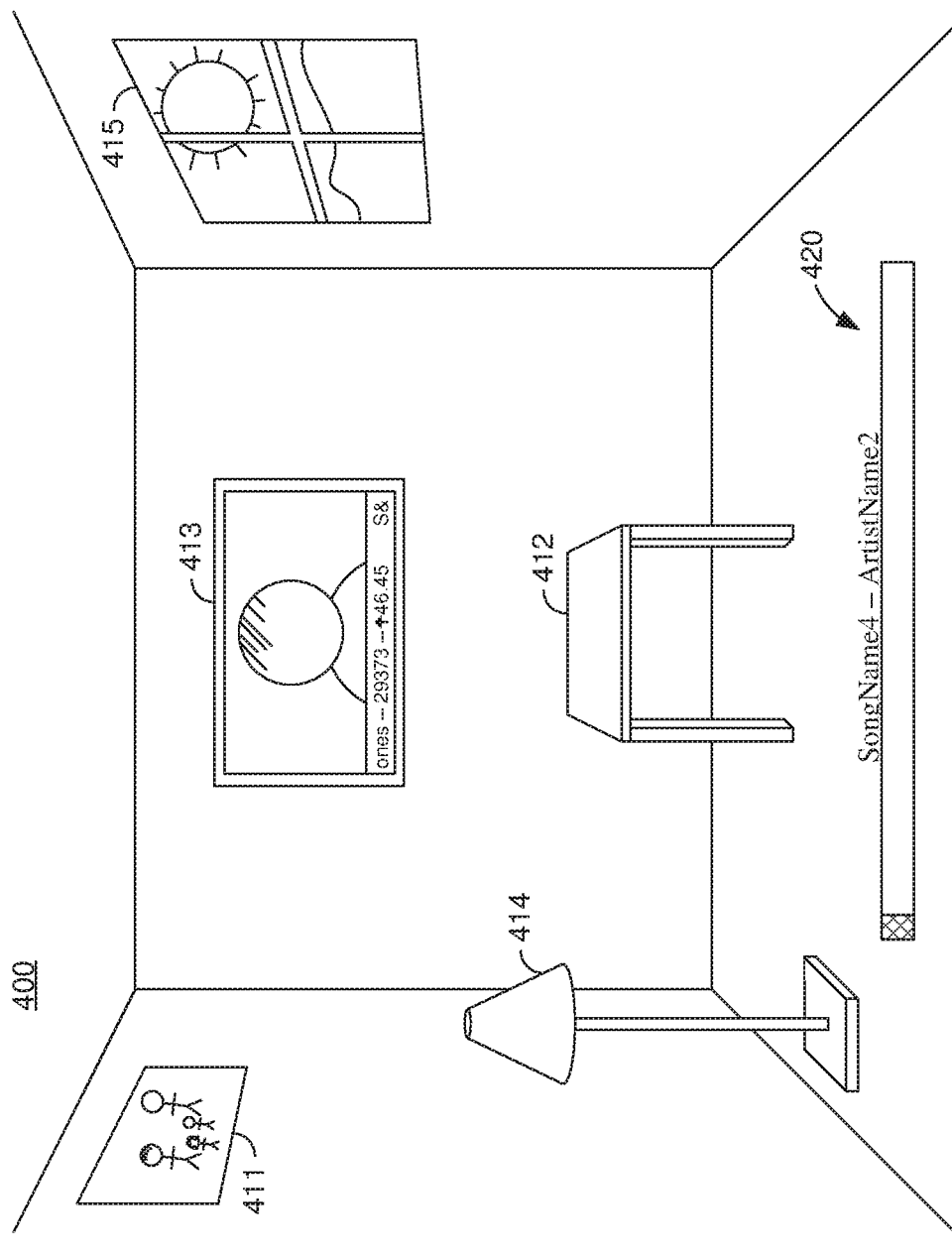

FIG. 10A illustrates the SR volumetric environment 400 of FIG. 4A at a first time during playback of a fourth audio file (e.g., a song entitled "SongName4" by an artist named "ArtistName2").

FIG. 10B illustrates the SR volumetric environment 400 of FIG. 4A at a second time during playback of the fourth audio file. In FIG. 10B, SR content (based on the audio file and the real environment) is displayed in the SR volumetric environment 400.

In FIG. 10B, a first set of audio/SR orbs 1011A are displayed in the SR volumetric environment 400. The audio/SR orbs 1011A are based on the audio data of the fourth audio file. For example, in various implementations, the audio/SR orbs 1011A are based on volume and/or frequency of the audio data of the fourth audio file at the second time. For example, in various implementations, the size of the audio/SR orbs 1011A at various locations are based on the volume at various frequencies of the audio data of the fourth audio file at the second time. Accordingly, in various implementations, the audio/SR orbs 1011A are generated using an audio visualizer algorithm.

The audio/SR orbs 1011A are based on the real environment in that they are virtual objects located at various locations in the SR volumetric environment 400 that interact with (as described below) and are affected by the SR virtual environment 400 (e.g., being lit by light emitted from the lamp 414 or through the window 415.

FIG. 10C illustrates the SR volumetric environment 400 of FIG. 4A at a third time during playback of the fourth audio file. In FIG. 10C, the first set of audio/SR orbs 1011A have moved (e.g., fallen) in the SR volumetric environment 400.

Figure 10D:
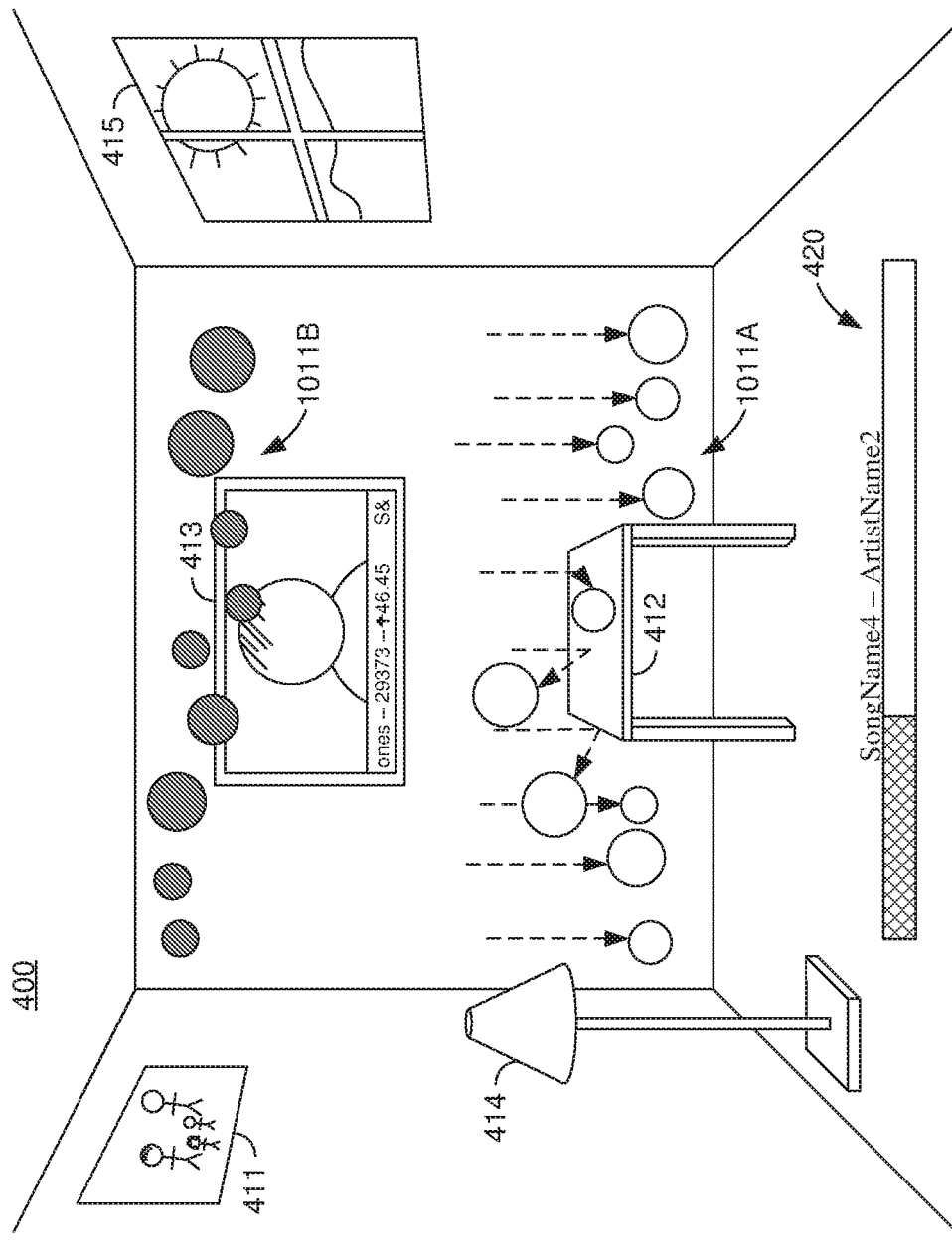

FIG. 10D illustrates the SR volumetric environment 400 of FIG. 4A at a fourth time during playback of the fourth audio file. In FIG. 10D, the first set of audio/SR orbs 1011A have moved (e.g., fallen further and interacted with the table 412) in the SR volumetric environment 400. As shown in FIG. 10D, a few of the audio/SR orbs 1011A have been affected by the SR volumetric environment 400. In particular, the path of three of audio/SR orbs 1011A have been changed by the presence of the table 412 in the SR volumetric environment 400.

In FIG. 10D, a second set of audio/SR orbs 1011B are displayed in the SR volumetric environment 400. The audio/SR orbs 1011B are based on the audio data of the fourth audio file at the fourth time. For example, in various implementations, the audio/SR orbs 1011B are based on volume and/or frequency of the audio data of the fourth audio file at the fourth time. For example, in various implementations, the size of the audio/SR orbs 1011B at various locations are based on the volume at various frequencies of the audio data of the fourth audio file at the fourth time. Accordingly, in various implementations, the audio/SR orbs 1011A are generated using an audio visualizer algorithm.

Figure 10E:
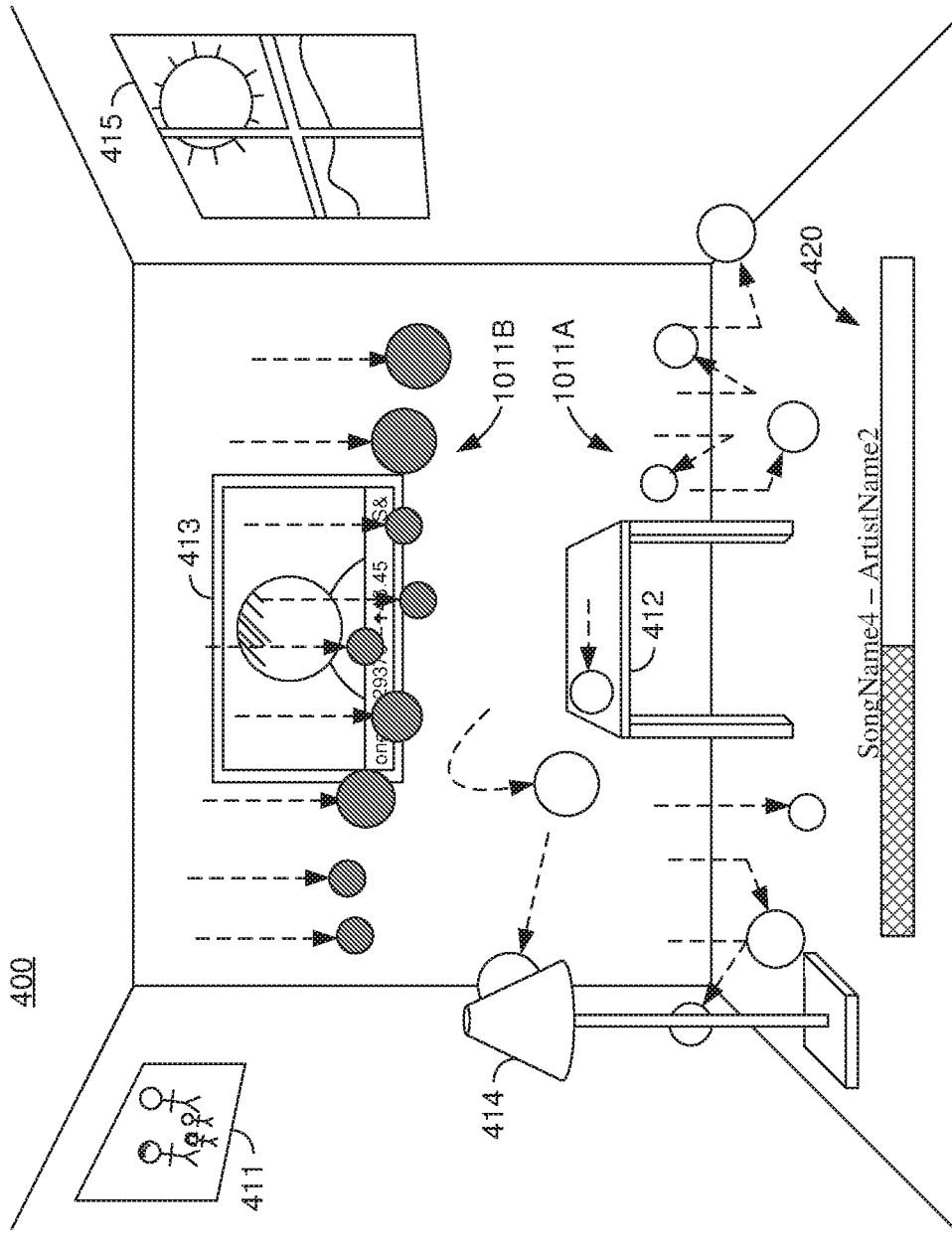

FIG. 10E illustrates the SR volumetric environment 400 of FIG. 4A at a fifth time during playback of the fourth audio file. In FIG. 10E, the first set of audio/SR orbs 1011A have moved (e.g., fallen further and interacted with the table 412 and floor) in the SR volumetric environment 400. As shown in FIG. 10E, a few of the audio/SR orbs 1011A have been affected by the SR volumetric environment 400. In particular, the path of many of audio/SR orbs 1011A have been changed by the floor of the SR volumetric environment 400. Further, two of the audio/SR orbs 1011A are occluded by the lamp 414. Similarly, the second set of audio/SR orbs 1011B have moved (e.g., fallen) in the SR volumetric environment 400.

Figure 11:
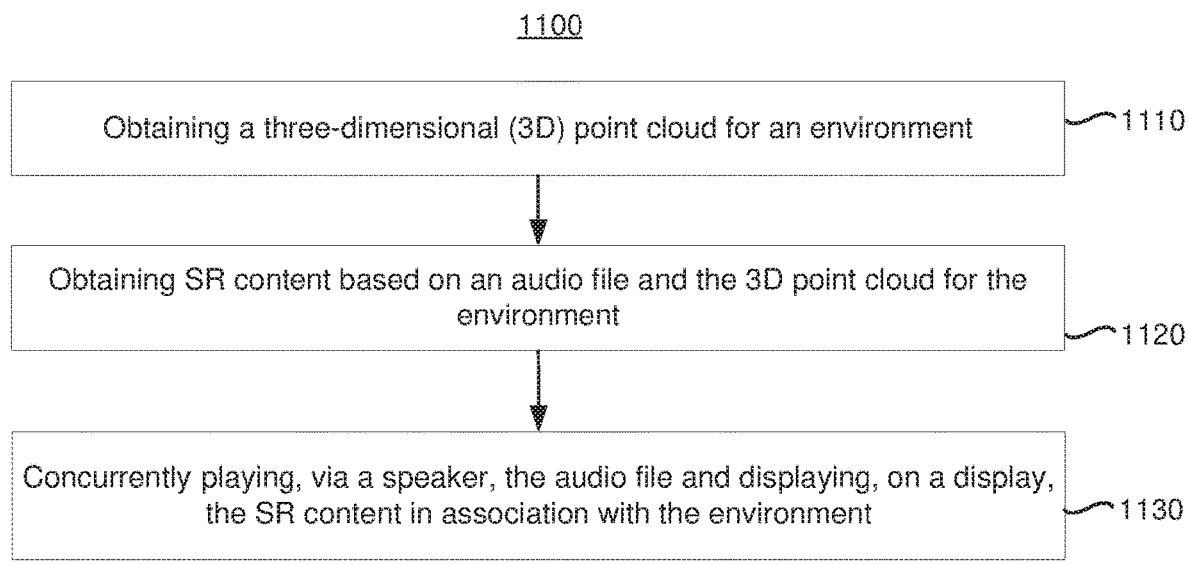
FIG. 11 is a flowchart representation of a second method of presenting an audio/SR experience in accordance with some implementations.

FIG. 11 is a flowchart representation of a second method 1100 of presenting an audio/SR experience in accordance with some implementations. In various implementations, the method 1100 is performed by a device with one or more processors, non-transitory memory, a speaker, and a display (e.g., the HMD 120B of FIG. 3). In some implementations, the method 1100 is performed by processing logic, including hardware, firmware, software, or a combination thereof. In some implementations, the method 1100 is performed by a processor executing instructions (e.g., code) stored in a non-transitory computer-readable medium (e.g., a memory).

The method 1100 begins, in block 1110, with the device obtaining a three-dimensional (3D) point cloud for an environment. In various implementations, the point cloud is based on an image of the environment obtained by a scene camera and/or other hardware. In various implementations, the device includes the scene camera and/or other hardware. In various implementations, the scene camera and/or other hardware is part of a device that is worn by the user and includes a display that displays SR content (as described below with respect to block 1130). Thus, in various implementations, the user is physically present in the environment. In various implementations, the scene camera is part of remote device (such as a drone or robotic avatar) that transmits images from the scene camera to a local device that is worn by the user and includes a display that displays the SR content.

In various implementations, the point cloud includes a plurality of 3D points in the 3D SR coordinate system. In various implementations, the 3D SR coordinate system is gravity-aligned such that one of the coordinates (e.g., the z-coordinate) extends opposite the direction of a gravity vector. The gravity vector may be obtained by an accelerometer of the device. Each point in the point cloud represents a point on a surface of the environment, e.g., with respect to the SR volumetric environment 400 of FIG. 4A, a point on the wall (or the photograph 411, television 413, or window 415 on the wall), the floor, the lamp 414, or table 412. In various implementations, the point cloud is obtained using VIO (visual inertial odometry) and/or a depth sensor. In various implementations, the point cloud is based on the image of the environment and previous images of the environment taken at different angles to provide stereoscopic imaging. In various implementations, a point in the point cloud is associated with metadata, such as a color, texture, reflectance, or transmittance of the point on the surface in the environment or a confidence in the position of the point on the surface in the environment.

Thus, in various implementations, the 3D point cloud for the environment is obtained from pass-through image data (e.g., images captured by the scene camera) characterized by a plurality of poses in the environment (e.g., at various orientations and/or locations), wherein each of the plurality of poses in the environment is associated with a respective field of view of an image sensor (e.g., the scene camera).

In various implementations, the device generates characterization vectors for points of the 3D point cloud, wherein each of the characterization vectors includes one or more labels. The one or more labels of a particular characterization vector for a particular point of the 3D point cloud are associated with a type of physical object and/or a feature thereof. For example, the characterization vector can include a label that indicates that the particular point of the 3D point cloud corresponds to the surface of a room boundary (such as a ceiling, floor, or wall), a table, or a lamp in the real environment. In various implementations, the characterization vector includes multiple labels associated with macro and micro information. For example, the characterization vector can include a first label that indicates that the particular point of the 3D point cloud corresponds to the surface of a room boundary and a second label that indicates that the particular point of the 3D point cloud corresponds to the surface of a wall. As another example, the characterization vector can include a first label that indicates that the particular point of the 3D point cloud corresponds to the surface of a table and a second label that indicates that the particular point of the 3D point cloud corresponds to the surface of a leg of the table.

In various implementations, the characterization vectors are generated by a machine-learning process, e.g., by a neural network. In various implementations, generating the characterization vectors includes disambiguating groups of points from the 3D point cloud, wherein the characterization vectors for the group of points satisfy object confidence criteria. In various implementations, a difference threshold is satisfied if machine-learning assigned labels included in the characterization vectors for respective points are sufficiently similar to each other. In various implementations, multiple clusters of points for multiple candidate objects are identified.

In various implementations, generating the characterization vectors includes determining a volumetric region for the group of points, wherein the volumetric region corresponds to a 3D representation of an object in the space. In various implementations, the object confidence criteria are satisfied when, with respect to a particular candidate object, the 3D point cloud includes a sufficient number of points in order to satisfy a threshold level of confidence regarding the identity of the object and/or a threshold level of confidence in the accuracy regarding the computed volume. In various implementations, the object confidence criteria are satisfied when, with respect to a particular candidate object, the points of the 3D point cloud are sufficiently close to each other in order to satisfy a threshold level of confidence regarding the identity of the object and/or a threshold level of confidence regarding the accuracy of the computed volume. Accordingly, in various implementations, the device detects, based on the characterization vectors for points of the 3D point cloud, an object in the environment having a particular object type.

In various implementations, the device detects one or more surfaces in the environment. In various implementations, the surfaces are labeled (e.g., based on the characterization vectors). In various implementations, the surfaces are unlabeled and defined only by their location and boundaries. The devices can employ a variety of methods to detect a surface (e.g., a planar surface) from the point cloud. For example, in various implementations, RANSAC (random sample consensus) methods are used to detect a surface based on the point cloud. In one RANSAC method of detecting a planar surface, an iteration includes selecting three random points in the point cloud, determining a plane defined by the three random points, and determining the number of points in the point cloud within a preset distance (e.g., 1 cm) of the plane. That number of points forms a score (or confidence) for the plane and after a number of iterations, the plane with the highest score is selected as a detected planar surface. With the points on that plane detected removed from the point cloud, the method can be repeated to detect another planar surface.

The method 1100 continues, in block 1120, with the device obtaining SR content based on an audio file and the 3D point cloud for the environment.

In various implementations, the device obtains SR content based on audio data of the audio file. For example, in FIGS. 9B-9C, the device obtains SR content including audio/SR lines 911A-911B based on the audio data of the third audio file (e.g., volume and/or frequency). As another example, in FIGS. 10B-10E, the device obtains SR content including audio/SR orbs 1011A-1011B based on the audio data of the fourth audio file (e.g., volume and/or frequency). Thus, in various implementations, the SR content includes abstract visualization based on volume dynamics and/or frequency dynamics. As another example, in FIG. 8B, the device obtains SR content including candles 812 based, at least partially, on an analysis of the audio data of the second file (e.g., the tempo or mood [along with, optionally, lyrics] indicating that the song corresponding to the second file is a love song).

In various implementations, the device obtains SR content based on metadata of the audio file, such as a title, artist, album, genre, lyrics, etc. For example, in FIG. 8B, the device obtains SR content including an album cover 811 of a particular album based on the metadata of the second audio file including an album field with an album field value indicating the particular album. As another example, in FIG. 8B, the device obtains SR content including a concert clip 813 of the artist playing the song of the second audio file based on the metadata of the second audio file including an artist field with an artist field value indicating the artist. As another example, in FIG. 8B, the device obtains SR content including rain 815 based on the metadata of the second audio file including a title field with a title field value including the word "rain." As another example, in FIG. 8B, the device obtains SR content including a Greek column 814 based on the metadata of the second audio file including a genre field with a genre field value of "Greek."

In various implementations, the device obtains SR content based on lyrics of the audio file, either through audio analysis to determine the lyrics or based on a lyrics field value of a lyrics field of metadata of the audio file. For example, in FIG. 8B, the device obtains SR content including a fireplace 816 based on the metadata of the second audio file including a lyrics field with a lyrics field value including the phrase "sitting by the fire." As another example, in FIG. 8B, the device obtains SR content including candles 812 based, at least partially, on lyrics of the second file indicating that the song corresponding to the second audio file is a love song. As another example, the device obtains SR content turning the SR volumetric environment into space based on lyrics evoking a space theme (e.g., "stars look very different today . . . far above the moon/planet earth is blue").

In various implementations, the device obtains SR content based on a surface sets of one or more surfaces, detected in the 3D point cloud of the environment, meeting presentation criteria. For example, in various implementations, the device obtains SR content based on detecting a flat, vertical surface big enough for presentation of SR content. For example, in FIG. 8B, the device obtains SR content including a fireplace 816 based on detecting a flat, vertical surface (e.g., the wall) of at least a threshold size for display of the fireplace. As another example, in various implementations, the device obtains SR content based on detecting multiple surfaces defining an object of a particular shape. For example, in FIG. 8B, the device obtains SR content including a Greek column 814 based on detecting a tall, skinny object (e.g., the lamp 414). As another example, the device obtains SR content including a disco ball based on detecting a round object approximately one foot in diameter.

In various implementations, the device obtains SR content based on characterization vectors for the 3D point cloud of the environment. For example, in various implementations, the device obtains SR content based on detecting an object in the environment having a particular object type. For example, in FIG. 8B, the device obtains SR content including an album cover 811 based on detecting the photograph 411. As another example, in FIG. 8B, the device obtains SR content including a concert clip 813 of the artist playing the song of the second audio file based on detecting the television 413. As another example, in FIG. 8B, the device obtains SR content including rain 815 based on detecting the window 415. As another example, in FIG. 8B, the device obtains SR content including candles 812 based on detecting the table 412.

In various implementations, the device obtains SR content by selecting the SR content from a library of labeled SR content elements based on one or more characteristics of the audio file and the environment. In various implementations, the library is stored remote from the device, e.g., available over the Internet.

The method 1100 continues, in block 1130, with the device, concurrently playing, via a speaker, the audio file and displaying, on a display, the SR content in association with the environment. In various implementations, displaying the SR content includes displaying SR content over an object detected in the environment, in particular implementations, the object upon which obtaining the SR content was based. Accordingly, in various implementations, displaying the SR content includes replacing a real object in an SR volumetric environment with a virtual object in the SR volumetric environment. In various implementations, displaying the SR content includes displaying content proximate to or attached to a detected object, in particular, the object upon which obtaining the SR content was based. Accordingly, in various implementations, displaying the SR content includes displaying a virtual object attached to a real object in the SR volumetric environment.

In various implementations, the displaying the SR content in association with the environment includes playing, via the speaker concurrently with the audio file, a supplemental audio file associated with the SR content. For example, in FIG. 8B, the concert clip 813 can include audio of an audience cheering, the rain 815 can include audio of rain falling, or the fireplace 816 can include audio of the fire burning.

Figure 12A:
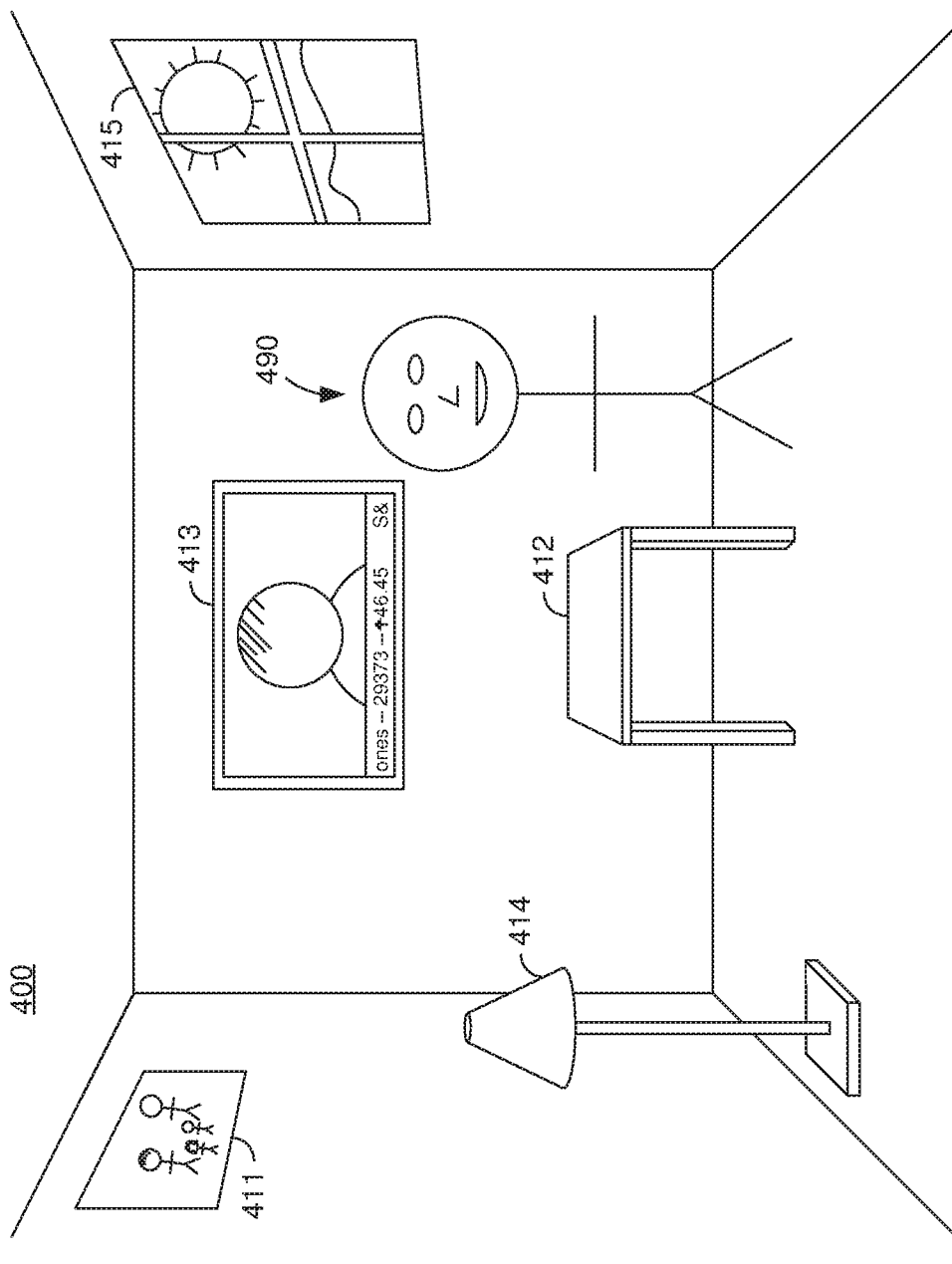

FIG. 12A illustrates the SR volumetric environment 400 of FIG. 4A at a first time during a story told a storyteller 490. In various implementations, the storyteller 490 is present in the SR volumetric environment. In various implementations, the storyteller 490 is a real object, e.g., a person or an audio producing device. In various implementations, the storyteller 490 is a virtual object displayed by the device.

Figure 12B:
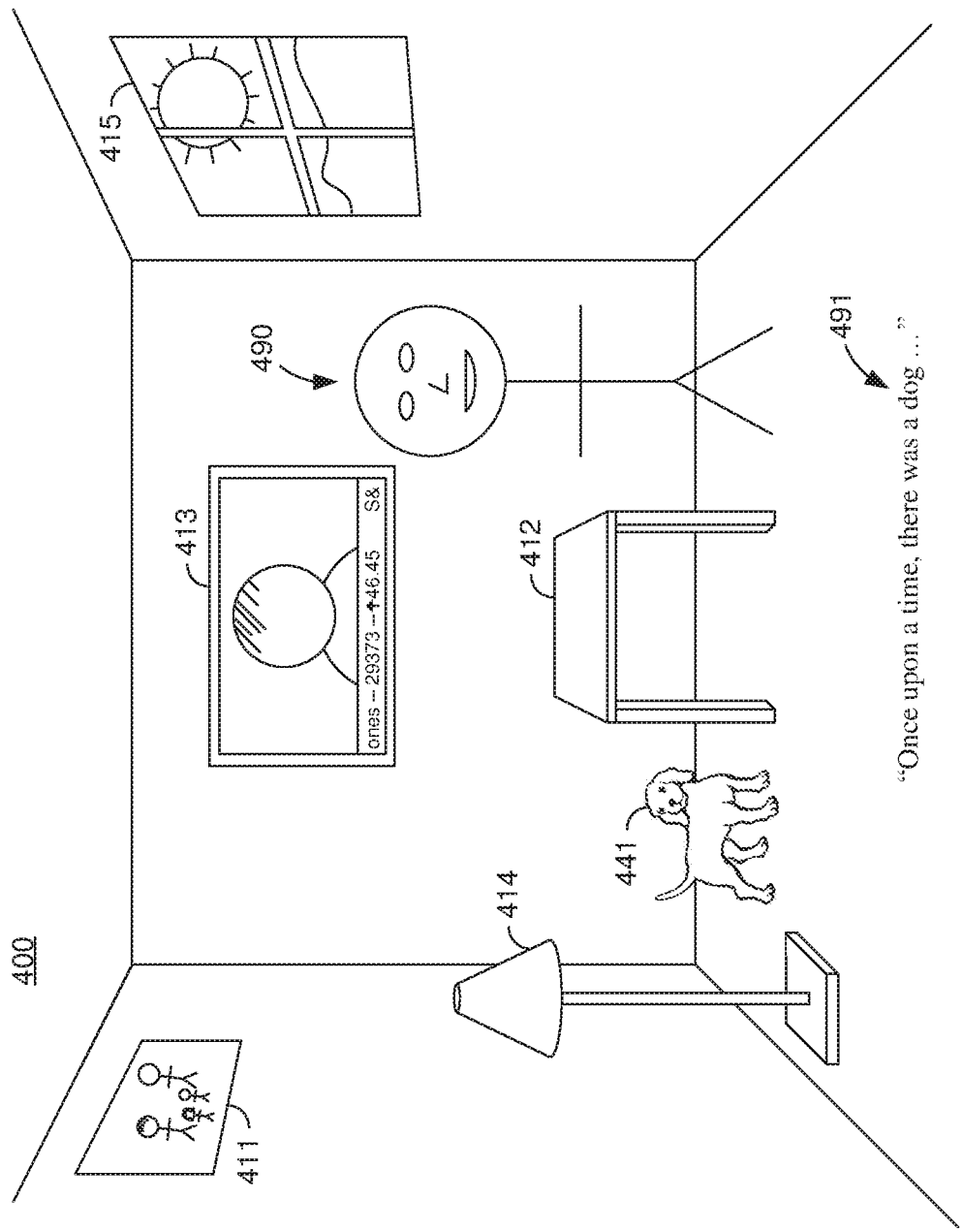

FIG. 12B illustrates the SR volumetric environment 400 of FIG. 4A at a second time during the story. In various implementations, the storyteller 490 produces a real sound in the environment. In various implementations, the real sound includes one or more spoken words. In FIG. 12B, SR content based on the spoken words and, optionally, the real environment) is displayed in the SR volumetric environment 400.

In FIG. 12B, in response to determining that the spoken words of a first part of the story 491 include the word "dog," the SR volumetric environment 400 includes an additional virtual object, e.g., a dog 441.

Figure 12C:
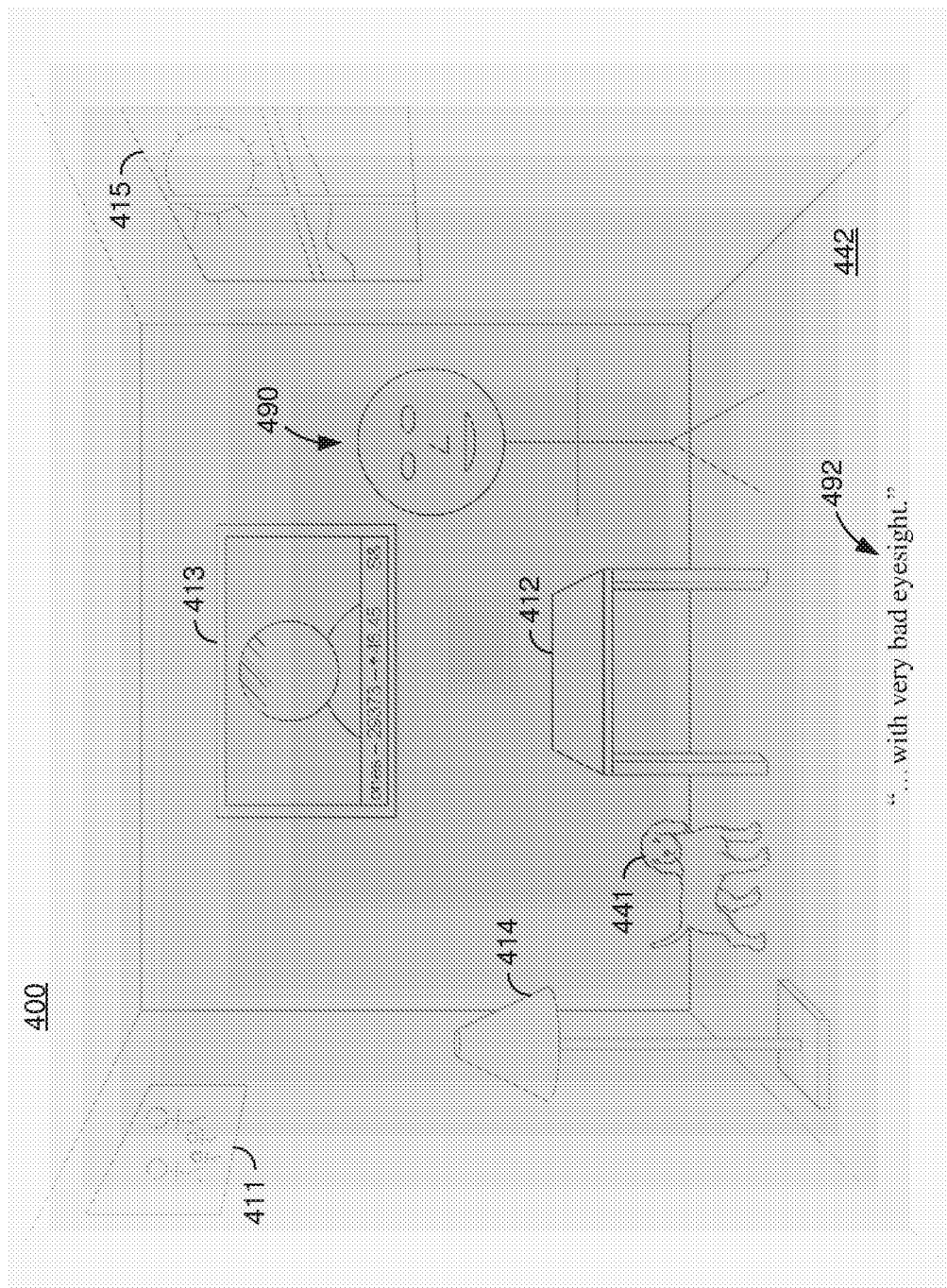

FIG. 12C illustrates the SR volumetric environment 400 of FIG. 4A at a third time during the story. In FIG. 12C, in response to determining that the spoken words of a second part of the story 492 include the phrase "bad eyesight," the SR volumetric environment 400 is displayed through a virtual object, e.g., an optical filter 442.

FIG. 12D illustrates the SR volumetric environment 400 of FIG. 4A at a fourth time during the story. In FIG. 12D, in response to determining that the spoken words of a third part of the story 493 include the word "food" and the modifying phrase "on the table," and further in response to detecting the table 412 in the SR volumetric environment 400, the SR volumetric environment 400 includes another virtual object, e.g., food 443.

Figure 12E:
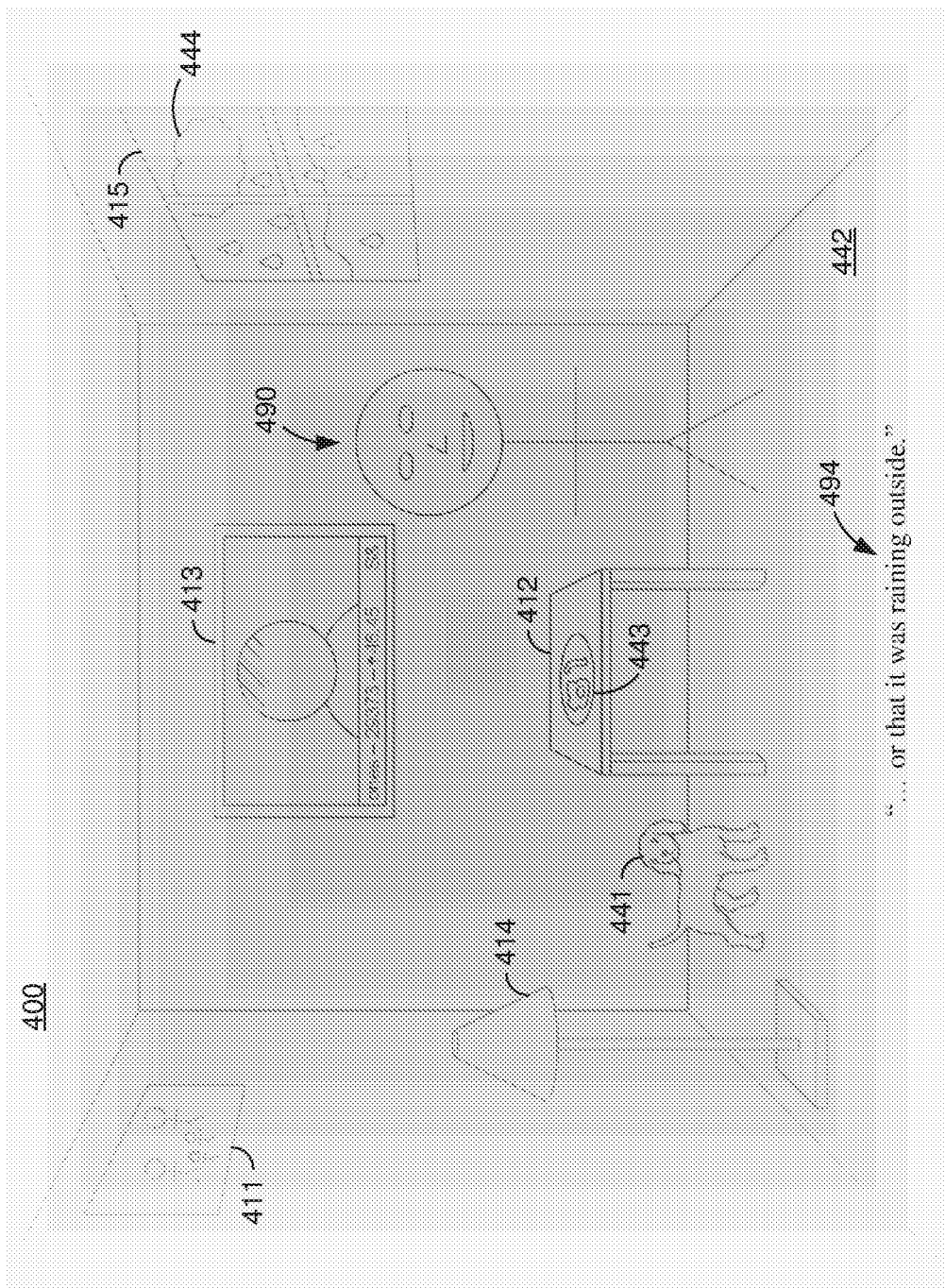

FIG. 12E illustrates the SR volumetric environment 400 of FIG. 4A at a fifth time during the story. In FIG. 12E, in response to determining that the spoken words of a fourth part of the story 494 include the word "raining" and the modifying phrase "outside," and further in response to detecting the window 415 in the SR volumetric environment 400, the SR volumetric environment 400 includes another virtual object, e.g., rain 444.

Figure 13:
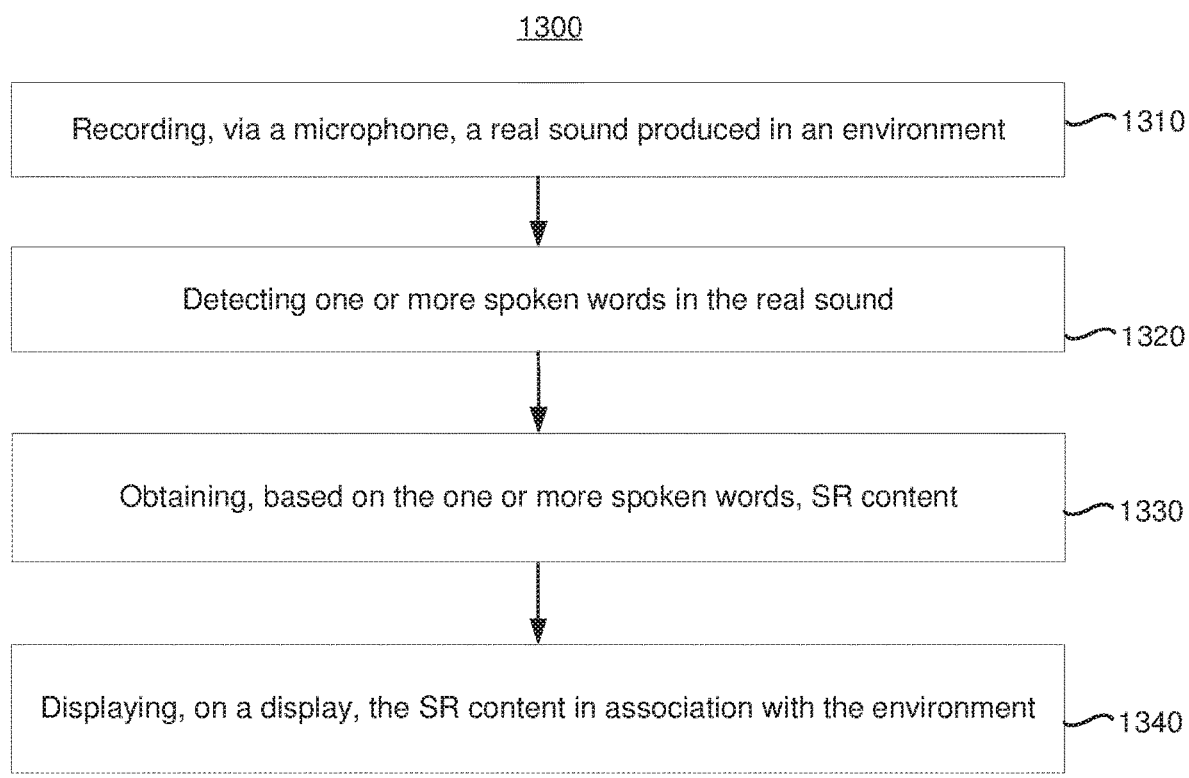
FIG. 13 is a flowchart representation of a third method of presenting an audio/SR experience in accordance with some implementations.

FIG. 13 is a flowchart representation of a third method 1300 of presenting an audio/SR experience in accordance with some implementations. In various implementations, the method 1300 is performed by a device with one or more processors, non-transitory memory, and one or more SR displays (e.g., the HMD 120B of FIG. 3). In some implementations, the method 1300 is performed by processing logic, including hardware, firmware, software, or a combination thereof. In some implementations, the method 1300 is performed by a processor executing instructions (e.g., code) stored in a non-transitory computer-readable medium (e.g., a memory).

The method 1300 begins, in block 1310, with the device recording, via a microphone, a real sounds produced in an environment. In various implementations, the device includes the microphone. In various implementations, the microphone is part of a device that is worn by the user and includes a display that displays SR content (as described below with respect to block 1340). Thus, in various implementations, the user is physically present in the environment. In various implementations, the scene camera is part of remote device (such as a drone or robotic avatar) that transmits images from the scene camera to a local device that is worn by the user and includes a display that displays the SR content.

The method 1300 continues, in block 1320, with the device detecting one or more spoken words in the real sound. In various implementations, the device employs one or more speech recognition algorithms to detect the spoken words in the real sound.

The method 1300 continues, in block 1330, with the device obtaining, based on the one or more spoken words, SR content. In various implementations, the device detecting, in the one or more spoken words, a trigger word and obtains the SR content based on the trigger word. For example, in FIG. 12B, in response to detecting the trigger word "dog," the device obtains SR content including the dog 441. In various implementations, the device further detects, a modifier word associated with the trigger word and obtains the SR content based on the modifier word. For example, in FIG. 12D, in response to detecting the trigger word "raining" and the modifier word "outside," the device obtains SR content including rain 444.

In various implementations, obtaining the SR content is further based on one or more spatial characteristics of the environment (e.g., characteristics other than the presence of sound in the environment).

For example, in various implementations the SR content is obtained based on the environment being a particular environment class. In various implementations, SR content is obtained based on the environment including an object of a particular shape. For example, in FIG. 12E, in response to detecting the phase "outside" and further in response to detecting the window 415, the SR content includes rain 444 outside the window 415. In various implementations, SR content is obtained based on the environment including an object of a particular type. For example, in FIG. 12D, in response to detecting the phrase "on the table" and further in response to detecting the table 412 in the SR volumetric environment 400, the SR content includes food 443 on the table 412.

In various implementations, obtaining the SR content includes selecting the SR content from a library of labeled SR content elements based on at least one of the one or more spoken words. In various implementations, the library is stored remote from the device, e.g., over the Internet.

The method 1300 continues, at block 1340, with the device displaying, on a display, the SR content in association with the environment. In various implementations, displaying the SR content includes displaying SR content over an object detected in the environment, in particular implementations, the object upon which obtaining the SR content was based. Accordingly, in various implementations, displaying the SR content includes replacing a real object in an SR volumetric environment with a virtual object in the SR volumetric environment. In various implementations, displaying the SR content includes displaying content proximate to or attached to a detected object, in particular, the object upon which obtaining the SR content was based. Accordingly, in various implementations, displaying the SR content includes displaying a virtual object attached to a real object in the SR volumetric environment.

In various implementations, the displaying the SR content in association with the environment includes playing, via the speaker, a supplemental audio file associated with the SR content. For example, in FIG. 12E, the dog 441 can include audio of a dog barking or the rain 444 can include audio of rain falling.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a", "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising: at a device including a processor, non-transitory memory, an image sensor, a speaker, and a display:
   storing, in the non-transitory memory, an audio file having an associated timeline;
   storing, in the non-transitory memory in association with the audio file, a plurality of content events, wherein each of the plurality of content events is associated with a respective temporal criterion and a respective environmental criterion; and
   while playing, via the speaker, the audio file:
   determining, using the processor, that the respective temporal criterion of a particular one of the plurality of content events is met based on a current position in the timeline of the audio file;
   capturing, based on an image analysis of the image, an image of a physical environment of the device;
   determining, using the processor, that the respective environmental criterion of the particular one of the plurality of events is met based on the image of the physical environment indicating that the physical environment of the device includes a physical object having a particular shape or being of a particular type; and in response to determining that the respective temporal criterion and the respective environmental criterion of the particular one of the plurality of content events are met, displaying, on a portion of the display that is selected based on a location and the particular shape or the particular type of the physical object within the physical environment of the device, the particular one of the plurality of content events in association with the physical environment.

2. The method of claim 1, wherein determining that the respective temporal criterion of the particular one of the plurality of content events is met comprises determining that the current position in the timeline of the audio file matches a trigger time of the particular one of the plurality of content events.

3. The method of claim 1, wherein determining that the respective temporal criterion of the particular one of the plurality of content events is met comprises determining that the current position in the timeline of the audio file is within a trigger time range of the particular one of the plurality of content events.

4. The method of claim 1, wherein determining that the respective environmental criterion of the particular one of the plurality of content events is met comprises determining, based on the image, that the physical environment is a particular environment class.

5. The method of claim 1, wherein displaying, on the display, the particular one of the plurality of content events in association with the physical environment is further performed in response to determining that one or more additional criterion is met.

6. The method of claim 1, wherein displaying, on the display, the particular one of the plurality of content events in association with the physical environment includes playing, via the speaker concurrently with the audio file, a supplemental audio file associated with the particular one of the plurality of content events.

7. The method of claim 1, wherein:
a first content event of the plurality of content events is associated with a first temporal criterion and a first environmental criterion;
a second content event of the plurality of content events is associated with a second temporal criterion and a second environmental criterion;
the first temporal criterion is the same as the second temporal criterion;
the first environmental criterion is different than the second environmental criterion;
the first content event is different than the second content event; and
the method comprising displaying, on the display, the first content event in association with the physical environment without displaying the second content event.

8. The method of claim 1, wherein:
a first content event of the plurality of content events is associated with a first temporal criterion and a first environmental criterion;
a second content event of the plurality of content events is associated with a second temporal criterion and a second environmental criterion;
the first temporal criterion is different than the second temporal criterion;
the first environmental criterion is the same as the second environmental criterion;
the first content event is different than the second content event; and
the method comprising displaying, on the display, the first content event in accordance with the first temporal criterion and displaying the second content event in accordance with the second temporal criterion.

9. The method of claim 1, comprising:
storing, in the non-transitory memory, a plurality of audio files, each having an associated timeline; and
storing, in the non-transitory memory in association with respective ones of the plurality of audio files, a plurality of content packages, each including a plurality of content events associated with a respective temporal criterion and a respective environmental criterion.

10. The method of claim 1, wherein determining that the respective environmental criterion of the particular one of the plurality of content events is met comprises determining that the physical object has a particular characteristic.

11. The method of claim 1, wherein displaying the particular one of the plurality of content events comprises displaying a virtual object on the portion of the display to provide an appearance that the virtual object is adjacent to the physical object.

12. A device comprising: a speaker; a display; an image sensor; a non-transitory memory; and one or more processors to:
store, in the non-transitory memory, an audio file having an associated timeline;
store, in the non-transitory memory in association with the audio file, a plurality of content events, wherein each of the plurality of content events is associated with a respective temporal criterion and a respective environmental criterion; and
while playing, via the speaker, the audio file:
determine that the respective temporal criterion of a particular one of the plurality of content events is met based on a current position in the timeline of the audio file;
capture, by the image sensor, an image of a physical environment of the device; determine that the respective environmental criterion of the particular one of the plurality of events is met based on the image of the physical environment indicating that the physical environment of the device includes a physical object; and
in response to determining that the respective temporal criterion and the respective environmental criterion of the particular one of the plurality of content events are met, display, on a portion of the display that is selected based on a location and the particular shape or the particular type of the physical object within the physical environment of the device, the particular one of the plurality of content events in association with the physical environment.

13. The device of claim 12, wherein the one or more processors are to determine that the respective environmental criterion of the particular one of the plurality of content events is met by determining that the physical environment is of a particular environment class.

14. The device of claim 12, wherein:
a first content event of the plurality of content events is associated with a first temporal criterion and a first environmental criterion;
a second content event of the plurality of content events is associated with a second temporal criterion and a second environmental criterion;
the first temporal criterion is the same as the second temporal criterion;
the first environmental criterion is different than the second environmental criterion;

the first content event is different than the second content event; and the one or more processors are to display, on the display, the first content event in association with the physical environment without displaying the second content event.

15. The device of claim 12, wherein:

a first content event of the plurality of content events is associated with a first temporal criterion and a first environmental criterion;

a second content event of the plurality of content events is associated with a second temporal criterion and a second environmental criterion;

the first temporal criterion is different than the second temporal criterion;

the first environmental criterion is the same as the second environmental criterion;

the first content event is different than the second content event; and the one or more processors are to display, on the display, the first content event in accordance with the first temporal criterion and display the second content event in accordance with the second temporal criterion.

16. The device of claim 12, wherein displaying the particular one of the plurality of content events comprises displaying a virtual object on the portion of the display to provide an appearance that the virtual object is emerging from the physical object or coming from behind the physical object.

17. The device of claim 12, wherein determining that the respective temporal criterion of the particular one of the plurality of content events is met comprises determining that the current position in the timeline of the audio file matches a trigger time of the particular one of the plurality of content events.

18. A non-transitory computer-readable medium having instructions encoded thereon which, when executed by one or more processors of a device including a speaker, an image sensor and a display, cause the device to:

store an audio file having an associated timeline;

store, in association with the audio file, a plurality of content events, wherein each of the plurality of content events is associated with a respective temporal criterion and a respective environmental criterion; and while playing, via the speaker, the audio file:

determine that the respective temporal criterion of a particular one of the plurality of content events is met based on a current position in the timeline of the audio file;

capture, by the image sensor, an image of a physical environment of the device; determine that the respective environmental criterion of the particular one of the plurality of events is met based on the image of the physical environment indicating that the physical environment of the device includes a physical object; and in response to determining that the respective temporal criterion and the respective environmental criterion of the particular one of the plurality of content events are met, display, on a portion of the display that is selected based on a location and the particular shape or the particular type of the physical object within the physical environment of the device, the particular one of the plurality of content events in association with the physical environment.

19. The non-transitory computer-readable medium of claim 18, wherein determining that the respective environmental criterion of the particular one of the plurality of content events is met comprises determining that the physical object has a particular reflectiveness.

20. The non-transitory computer-readable medium of claim 18, wherein displaying the particular one of the plurality of content events comprises displaying a virtual object on the portion of the display to provide an appearance that the virtual object is retreating into the physical object or hiding behind the physical object.

21. The non-transitory computer-readable medium of claim 18, wherein determining that the respective temporal criterion of the particular one of the plurality of content events is met comprises determining that the current position in the timeline of the audio file is within a trigger time range of the particular one of the plurality of content events.

22. The non-transitory computer-readable medium of claim 18, wherein determining that the respective environmental criterion of the particular one of the plurality of content events is met comprises determining, based on the image, that the physical environment is of a particular environment class.

* * * * *